United States Patent
Kanda et al.

[11] Patent Number: 6,142,604
[45] Date of Patent: Nov. 7, 2000

[54] INK-JET PRINTING APPARATUS AND INK-JET PRINTING METHOD

[75] Inventors: Hidehiko Kanda; Daigoro Kanematsu, both of Kawasaki, Japan

[73] Assignee: Canon Kabushiki Kaisha, Tokyo, Japan

[21] Appl. No.: 09/189,786

[22] Filed: Nov. 12, 1998

[30] Foreign Application Priority Data

Nov. 14, 1997 [JP] Japan ..................... 9-314051

[51] Int. Cl.[7] .............. B41J 2/145; B41J 2/15; B41J 29/38
[52] U.S. Cl. .............. 347/41; 347/9; 347/12
[58] Field of Search ........... 347/41, 43, 9, 347/12; 358/298

[56] References Cited

U.S. PATENT DOCUMENTS

| | | | |
|---|---|---|---|
| 4,313,124 | 1/1982 | Hara | 347/57 |
| 4,345,262 | 8/1982 | Shirato et al. | 347/10 |
| 4,459,600 | 7/1984 | Sato et al. | 347/47 |
| 4,463,359 | 7/1984 | Ayata et al. | 347/56 |
| 4,558,333 | 12/1985 | Sugitani et al. | 347/65 |
| 4,608,577 | 8/1986 | Hori | 347/66 |
| 4,723,129 | 2/1988 | Endo et al. | 347/56 |
| 4,740,796 | 4/1988 | Endo et al. | 347/56 |
| 5,748,207 | 5/1998 | Inui et al. | 347/43 |
| 5,818,474 | 10/1998 | Takahashi et al. | 347/15 |
| 5,852,454 | 12/1998 | Kanematsu et al. | 347/43 |

FOREIGN PATENT DOCUMENTS

| | | |
|---|---|---|
| 54-56847 | 5/1979 | Japan . |
| 59-138461 | 8/1984 | Japan . |
| 60-71260 | 4/1985 | Japan . |
| 60-107975 | 6/1985 | Japan . |

*Primary Examiner*—Thinh Nguyen
*Attorney, Agent, or Firm*—Fitzpatrick, Cella, Harper & Scinto

[57] ABSTRACT

In divided printing method performing printing for the same printing region for a plurality of times of scanning, in order to avoid formation of banding due to density variations at a boundary in each scanning region, a predetermined nozzle width (e.g. four nozzle width) of boundary portion is set for each scanning region corresponding to a nozzle array established by dividing a plurality of nozzles (e.g. 248 nozzles) of a printing head by N (e.g. N=4). The number of times of scanning in the boundary portion is set, e.g. three times, smaller than that in region other than the boundary portion. Also, for mutually adjacent boundary portions, three times of scans of each of the adjacent boundary portions are performed simultaneously. By this, in each of the boundaries of respective scanning regions, no time difference will be caused in scan for printing respective regions.

20 Claims, 18 Drawing Sheets

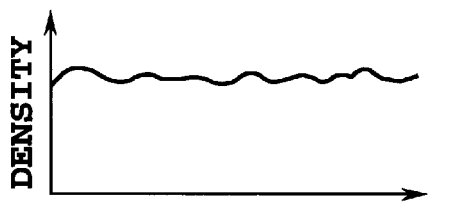
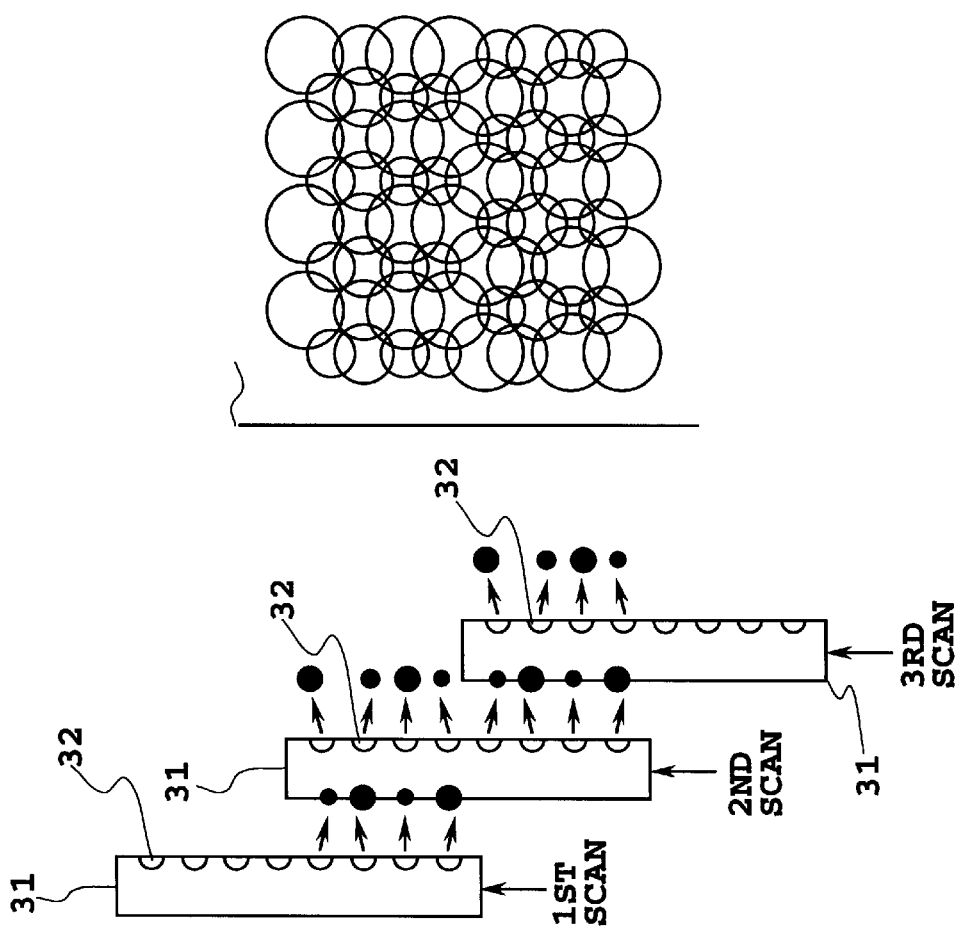
FIG.5C
FIG.5B
FIG.5A

LATTICE PATTERN

INVERTED LATTICE PATTERN

THINNING PATTERN (i)
 (ii)
 (iii)
 (iv)

I
 II
 III
 IV (NON)

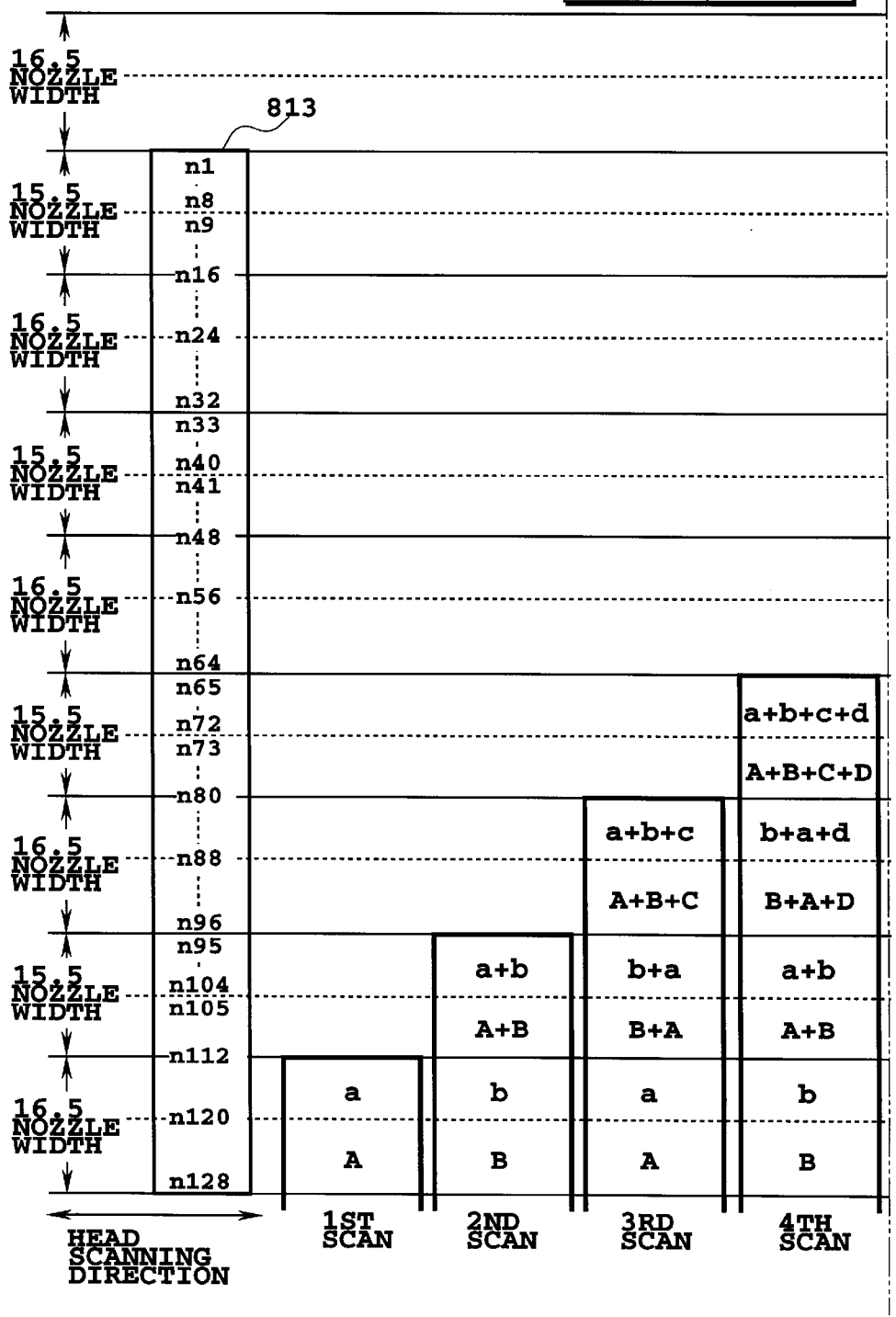

FIG. 17B

| 5TH SCAN | 6TH SCAN | 7TH SCAN | 8TH SCAN | 9TH SCAN |
|---|---|---|---|---|
|  |  |  |  | a+b+c+d+e+f |
|  |  |  |  | A+B+C+D+E+F+G+H |
|  |  |  | a+b+c+d+e+f | b+a+d+c+f+g |
|  |  |  | A+B+C+D+E+F+G+H | B+A+D+C+F+E+H+G |
|  |  | a+b+c+d+e+f | b+a+d+c+f+g | a+b+c+d+e+f |
|  |  | A+B+C+D+E+F+G+H | B+A+D+C+F+E+H+G | A+B+C+D+E+F+G |
|  | a+b+c+d+e+f | b+a+d+c+f+g | a+b+c+d+e+f | b+a+d+c+f+g |
|  | A+B+C+D+E+F+G | B+A+D+C+F+E+H | A+B+C+D+E+F+G | B+A+D+C+F+E |
| a+b+c+d+e+f | b+a+d+c+f+g | a+b+c+d+e+f | b+a+d+c+f+g | a+b+c+d+e+f |
| A+B+C+D+E+F | B+A+D+C+F+E | A+B+C+D+E+F | B+A+D+C+F+E | A+B+C+D+E+F |
| a+b+c+d+e | b+a+d+c+f | a+b+c+d+e | b+a+d+c+f | a+b+c+d+e |
| A+B+C+D+E | B+A+D+C+F | A+B+C+D+E | B+A+D+C+F | A+B+C+D+E |
| b+a+d+c | a+b+c+d | b+a+d+c | a+b+c+d | b+a+d+c |
| B+A+D+C | A+B+C+D | B+A+D+C | A+B+C+D | B+A+D+C |
| a+b+c | b+a+d | a+b+c | b+a+d | a+b+c |
| A+B+C | B+A+D | A+B+C | B+A+D | A+B+C |
| b+a | a+b | b+a | a+b | b+a |
| B+A | A+B | B+A | A+B | B+A |
| a | b | a | b | a |
| A | B | A | B | A |

↑ PAPER FEEDING DIRECTION

INK-JET PRINTING APPARATUS AND INK-JET PRINTING METHOD

This application is based on Patent Application No. 9-314051 (1997) filed Nov. 14, 1997 in Japan, the content of which is incorporated hereinto by reference.

BACKGROUND OF THE INVENTION

1. Field of the Invention

The present invention relates generally to an ink-jet printing apparatus and an ink-jet printing method performing printing by ejecting an ink toward a printing medium. More particularly, the invention relates to reduction of variations of density at a boundary between printing scanning regions, so-called banding, and so on.

2. Description of the Related Art

A recording apparatus to be employed as a printing output means of a printer, a copy machine, a facsimile machine and so on, or a recording apparatus to be employed as a printing output device of a composite type electronic device including a computer, a word processor and so on, a work station and so on is constructed for forming an image or the like on a medium to be recorded, such as a paper, a plastic film and the like (hereinafter referred to as a printing medium or paper) on the basis of an image information (including all information including character information and the like to be output). Such recording apparatus may be separated into an ink-jet type, a wire dot type, a thermal type, a laser beam type and so on. Amongst, the ink-jet type recording apparatus (hereinafter referred to as ink-jet recording apparatus) is designed to perform recording by ejecting ink toward the medium to be printed from recording means including a recording head and are advantageous in respect of easiness of increasing of recording density, high speed, superior in silentness, and low cost in comparison with other recording type. On the other hand, in the recent years, needs for color output of color image and so forth is progressively increasing and large number of color ink-jet recording apparatus have been developed.

In such ink-jet recording apparatus, in order to improve recording speed, a recording head, in which a plurality of ink ejection openings and a plurality of liquid passages are integrated is employed as the printing head having a plurality of recording elements integrated as an array (hereinafter referred to as multi-head). Furthermore, for adaptation for color printing, it is typical to provide a plurality of multi-heads.

FIG. 1 shows a construction of a major portion of the apparatus for performing recording (hereinafter referred to as printing) employing the multi-heads set forth above. In FIG. 1, the reference numerals 101 denote ink-jet cartridges. Each of these is constructed with an ink tank storing black, cyan, magenta and yellow ink and the multi-head 102 corresponding to each color of the inks. FIG. 2 is a diagrammatic illustration of the ejection openings (hereinafter also referred to as nozzles) arranged in the multi-head 102 as viewed in z direction in FIG. 1. In FIG. 2, the reference numeral 201 denotes ejection openings arranged on each multi-head 102.

Referring again to FIG. 1, the reference numeral 103 denotes a paper feeding roller which is driven to rotate in a direction shown by arrow with gripping a printing paper P together with an auxiliary roller 104 for feeding the printing paper P in y direction. On the other hand, the reference numeral 105 denotes a pair of paper feeding rollers for feeding the printing paper. A pair of rollers 105 are designed to rotate with gripping the printing paper P in a similar manner to that of the rollers 103 and 104. By driving the rollers 105 at lower rotation speed than that of the paper feeding roller 103 appropriately, a tension can be applied to the printing paper appropriately. The reference numeral 106 denotes a carriage supporting the four ink-jet cartridges and scans those ink-jet cartridges according to progress of printing. While printing is not performed, the carriage 106 is placed in stand-by state at a home position h as illustrated by broken line while recovery process of ejection of the multi-head 102 is performed.

The carriage 106 at the home position h at initiation of printing, is moved in the x direction, responsive to a command for initiation of printing, so that printing for a width L on the paper by means of n in number of nozzles 201 of the multi-head 102 is performed. Once printing of data up to the end portion of the paper surface is completed, the carriage is returned to the original home position to again perform printing in x direction. After finishing of first print and before initiation of second print, the paper feeding roller 103 is rotated in the direction of arrow to perform paper feeding in y direction in the extent of the width L. As set forth above, by repeating printing for the multi-head width L and paper feeding per one scan of the carriage 106, printing for one page, for example, is completed.

In such ink-jet type printing apparatus, different from printing in a monochrome printer which prints only characters, for example, various printing characteristics, such as a color development characteristics, a gradation characteristics, uniformity of density and so on are required upon printing a graphic image. Particularly, for uniformity of density, it has been known that variations per nozzle due to slight tolerance caused during multi-head manufacturing process becomes perceptible as variations of the ejection amount and/or ejecting direction of each nozzle upon actual printing and finally can be a cause of degradation of a printing quality as density variations of the printing image.

Particular example will be explained with reference to FIGS. 3A, 3B, 3C and 4A, 4B, 4C. In FIG. 3A, the reference numeral 31 denotes a multi-head, in which eight nozzles 32 are arranged. The reference numeral 33 denotes an ink droplet ejected from each nozzle 32. Ideally, as shown in FIG. 3A, it is desirable to eject the ink in the same direction with substantially equal ejection amount. If ejection is performed in this manner, uniform size of dots are formed on the paper surface as shown in FIG. 3B to obtain a uniform image having no density fluctuation over the entire area (FIG. 3C).

However, in practice, due to variations of the nozzles as set forth above, if printing is performed in the same manner as that shown in FIGS. 3A to 3C, dots as shown in FIG. 4B are formed on the paper surface due to variations of size and direction of the ink droplets ejected from the nozzles as shown in FIG. 4A. In the example shown in FIGS. 4A to 4C, blank paper portions along with the head scanning direction which do not satisfy 100% of area factor, appear cyclically. Also, a black banding due to excessive overlap of dots, or, in the alternative, white banding as seen at the center of FIG. 4B can be caused. The image consisted of dots formed in such condition has density distribution shown in FIG. 4C with respect to arrangement direction of the nozzles and results in recognition as density variations.

On the other hand, different from the example shown in FIGS. 4A to 4C, it has conventionally known a banding due to variations of paper feeding amount.

As a solution for density variations or joint variations, in Japanese Patent Application Laying-open No. 60-107975

(1985), the following method has been disclosed in a monochrome ink-jet printing apparatus. A method will be briefly explained with reference to FIGS. 5A, 5B, 5C and 6A, 6B and 6C. In the shown method, scanning by the multi-head 31 is repeated for three times in order to complete printing in the shown printing region (FIG. 5A), in which the half of the printing region corresponding to each four nozzles are completely printed by twice of scanning (hereinafter also referred to as pass). Namely, in this case, eight nozzles of the multi-head 31 are separated into two groups of upper four nozzles and lower four nozzles. The dots to be printed by one scan of one nozzle corresponds to the predetermined image data thinned by substantially half in accordance with a predetermined pattern. Then, by performing complementary scanning according to respective patterns through twice of scanning, printing of the region corresponding to respective of upper and lower four nozzles can be completed. Foregoing manner of printing method will be hereinafter referred to as divided printing method.

By employing the divided printing method as set forth above, since influence of variations in each individual nozzle for the printed image in each region can be reduced into substantially half even when the multi-head the same as that shown in FIGS. 4A to 4C is employed, the printed image becomes as illustrated in FIG. 5B so that a black banding or a white banding is not perceptible as that shown in FIG. 4B. Accordingly, density variations can also be reduced significantly in comparison with the case shown in FIGS. 4A to 4C, as shown in FIG. 5C.

When printing is performed as set forth above, the image data is divided into a predetermined pattern in mutually complementary manner in the first scan and the second scan. In such case, it is typical to arrange the image data (thinning pattern) in lattice fashion per every other pixels in vertical and horizontal direction, as shown in FIG. 6C. Accordingly, in a unit printing region (here, a region corresponding to four nozzles), printing can be completed by the first scan, in which one lattice or checker pattern is printed, and the second scan, in which the other lattice or checker pattern (inverted lattice or checker pattern) complementary to one lattice or checker pattern.

FIGS. 6A, 6B and 6C illustrate how a predetermined region is printed by printing of one lattice pattern and the other lattice or checker pattern are performed.

In FIGS. 6A, 6B and 6C, in the first scan, one lattice or checker pattern is printed as shown in FIG. 6A by means of the lower four nozzles. Next, in the second scan, after performing paper feeding in a magnitude corresponding to four pixels (½ of head length), the other lattice pattern is printed by all nozzles (FIG. 6B). Furthermore, in the third scan, after paper feeding is performed in a magnitude corresponding to four pixels (½ of head length), one lattice pattern is again printed (FIG. 6C). In this manner, the paper feeding in a unit of four pixels, and printing of one lattice pattern and the other lattice pattern are performed alternately to complete printing of each printing regions of four pixels per each scan.

As set forth above, by completing printing by different two kinds of nozzles in the same region, high quality image free from density variations can be obtained.

On the other hand, as a technical task in the ink-jet printing apparatus, it has been known a problem associating with absorbency and evaporation characteristics of the ink on the printing paper, that irregularity of the dot shape and undesirable dots connection by deposition of the ink can be caused. Also, in the color ink-jet printing apparatus, in which a plurality of mutually different colors of inks are sequentially deposited in overlapping manner or at adjacent positions, a problem of degradation of printing quality due to undesirable bleeding or admixing of inks has been known. The conventional divided printing method set forth above may achieve an effect of improvement of the foregoing problem for smaller ink ejection amount per one scan. On the other hand, a multi-pass printing method, in which one image region is simply divided into a plurality of times of printing scan without performing particular paper feeding control as in the divided printing method, to perform printing according to thinning pattern in each scan or to perform printing in sequential order of colors, has been proposed as a measure for the problem set forth above.

In the divided printing method or the multi-pass printing method, a period required for completing printing of the image region except for the boundary of each scanning region corresponds to the number of printing scan cycles necessary for completing the image. However, in the region adjacent the boundary (hereinafter referred to as boundary portion), since printing in the first scan of the scanning region adjacent the boundary portion should influence the boundary portion, it takes a period to finally determine the density of the image in the boundary portion longer than that in the other scanning region by the extent corresponding to one scan. Namely, typically, the dot forming each pixel is formed in a size beyond the size of the pixel and dots of the adjacent pixels are partly overlapped. Accordingly, in the pixels of the boundary portion, density of these pixels can be determined only after initiation of printing in adjacent scanning region.

In the foregoing case, dots in respective boundary portions of adjacent scanning regions are formed with a time difference of at least one scan on the printing paper with each other. Thus, there arises a problem of causing a banding as density variations due to difference of penetration and fixing condition of the ink forming respective dots on the printing medium due to the time difference.

FIGS. 7A to 7D are diagrammatic illustrations showing a manner of deposition and fixing of the ink on the printing paper, which shows that fixing of the later deposited ink should be influenced depending upon degree of fixing of the ink deposited in advance.

Namely, the ink is ejected in a certain scan as shown in FIG. 7A. Then, the ink thus ejected is deposited on the printing paper P in a condition as represented by the ink portion shown by a black solid portion as shown in FIG. 7B. When the ink is ejected in the next scan in a condition where the ink deposited in the former scan is not sufficiently fixed as shown in FIG. 7C, later ejected ink may locally penetrate into the lower side of the former deposited ink to cause difference of the fixing condition as illustrated by the hatched portion in FIG. 7D. Such overlapping portion of the dots formed with the time difference is caused in the boundary portion to form the banding providing different appearance from other region. Particularly, in the solid print region to be printed at high printing duty, overlapping of the adjacent dots can be caused to make the density variations further significant to cause the banding.

SUMMARY OF THE INVENTION

The present invention has been worked out for solving the problems set forth above. Therefore, it is an object of the present invention to provide an ink-jet printing apparatus and an ink-jet printing method which can prevent occurrence of a banding due to density variations in a boundary of respective scanning region to perform high quality printing, in a printing method performing printing of the same region by a plurality of times of scanning, such as a divided printing method and the like.

In a first aspect of the present invention, there is provided an ink-jet printing apparatus employing a printing head capable of ejecting an ink, comprising:

means for scanning the printing head for a plurality of times with respect to the same scanning region of a printing medium;

means for relatively transporting the printing medium between the scans in a direction different from a scanning direction of the printing head;

means for driving the printing head during the scan for performing printing of respective scanning region sequentially; and control means for setting the number of times of scanning in a boundary portion in each scanning region adjacent to the other scanning region to be substantially smaller than that in regions other than the boundary portion, and effecting scan for the boundary portion simultaneously with scan of adjacent to the other scanning region.

Here, the control means may control generation of printing data to be supplied the printing head, thereby, setting the number of times of scanning along with driving operation of the printing head in the boundary portion to be smaller than that in the region other than the boundary region in the scanning region, and effecting scanning in the boundary portion simultaneously with scanning in the other scanning region.

The printing head may have a plurality of ink ejection openings arrayed in a direction different from the scanning direction, and the control means may have means for controlling relative transporting of the printing head to make the ink ejection openings differently used for a respective one of a plurality of scans for the same scanning region.

The same ink ejecting opening may be used for a plurality of scans for the same scanning region.

The control means may perform complementary printing in a plurality of times of scan by thinning with a predetermined thinning ratio, and the thinning ratio in the boundary portion may be smaller than the thinning ratio in the region other than the boundary portion.

The printing head may have an electrothermal transducer generating a thermal energy for causing film boiling in the ink as an energy to be used for ejection of the ink.

In a second aspect of the present invention, there is provided an ink-jet printing apparatus employing a printing head capable of ejecting an ink through a plurality of ink ejection openings associating with a printing scan, comprising:

means for making the printing head to scan for N times with dividing a region to be printed by the printing head having plurality of the ejection openings by N which N is an integer greater than or equal to two;

means for sequentially and relatively transporting a printing medium in a direction different from the direction of the scan, between the scans;

a first control means for performing image formation for each of the divided scanning regions by driving the printing head using N kinds of thinning patterns in mutually complementary relationship; and a second control means for making the number of timings of scanning for completing image formation of a boundary portion adjacent other scanning region to be substantially smaller than N times, and performing scanning simultaneously with scanning for the adjacent scanning region.

Here, the second control means may employ thinning patterns substantially smaller kinds than N kinds, as the thinning patterns in mutually complementary relationship.

The second control means may employ at least one kind of 100% thinning pattern as N kinds of thinning patterns in mutually complementary relationship.

Each scanning region divided into N may have a width of $(L/N)+K$ wherein K is greater than or equal to 0, and the transporting amount may be $(L/N)+K$.

The width K may be the width $T/N$ derived by dividing a width T of the boundary portion by N.

The boundary portion may be a region set on a front side and/or a rear side in the transporting direction of each scanning region divided into N.

The second control means may employ thinning patterns of $(N-M)$ kinds as thinning patterns in complementary relationship for completing image formation of the boundary portion upon performing image formation at a resolution of M times of a resolution of the plurality of ink ejection openings arrayed in the transporting direction, wherein M is an integer greater than or equal to one.

The thinning patterns may be random thinning patterns in mutually complementary relationship in a region located at position per M pixels in the transporting direction.

The transporting may be sequentially repeated in a width of $(L/N)+P$ and a width of $(L/N)-P$ assuming the width of the printing region being L in the printing region of M=double of resolution.

The printing head may have an electrothermal transducer generating a thermal energy for causing film boiling in the ink as an energy to be used for ejection of the ink.

In a third aspect of the present invention, there is provided an ink-jet printing method employing a printing head capable of ejecting an ink, comprising the steps of:

a step for scanning the printing head for a plurality of times with respect to the same scanning region of a printing medium;

a step for relatively transporting the printing medium between the scans in a direction different from a scanning direction of the printing head;

a step for driving the printing head during the scan for performing printing of respective scanning region sequentially; and a control step for setting the number of times of scanning in a boundary portion in each scanning region adjacent to the other scanning region to be substantially smaller than that in regions other than the boundary portion, and effecting scan for the boundary portion simultaneously with scan of adjacent to the other scanning region.

Here, the printing head may have a plurality of ink ejection openings arrayed in a direction different from the scanning direction, and at the control step, the relatively transporting of the printing head may be controlled to make the ink ejection openings differently used for the respective one of a plurality of scans for the same scaning region.

The same ink ejecting opening may be used for a plurality of scans for the same scanning region.

At the control step, complementary printing in a plurality of times of scan by thinning with a predetermined thinning ratio may be performed, and the thinning ratio in the boundary portion may be smaller than the thinning ratio in the region other than the boundary portion.

With the construction set forth above, in the boundary portion set in respective scanning region, by making the number of times of scanning for completing printing in the boundary portion substantially smaller than that in other region, each scan for the boundary portion is done simultaneously with the scan in the adjacent region. Therefore, at the boundary of adjacent scanning regions, it can be avoided to form the dots with time difference.

The above and other objects, effects, features and advantages of the present invention will become more apparent from the following description of the embodiments thereof taken in conjunction with the accompanying drawings.

BRIEF DESCRIPTION OF THE DRAWINGS

FIGS. 5A, 5B and 5C are illustrations for explaining reduction of density variations by a divided printing method to be employed in the embodiment of the present invention;

FIG. 17 is a diagram showing the relationship of FIGS. 17A and 17B;

FIG. 17A is an explanatory illustration of the fourth embodiment of the printing method according to the present invention; and FIG. 17B is an explanatory illustration of the fourth embodiment of the printing method according to the present invention.

DETAILED DESCRIPTION OF THE PREFERRED EMBODIMENT

The preferred embodiments of the present invention will be explained in detail with reference to the accompanying drawings.

Figure 1:
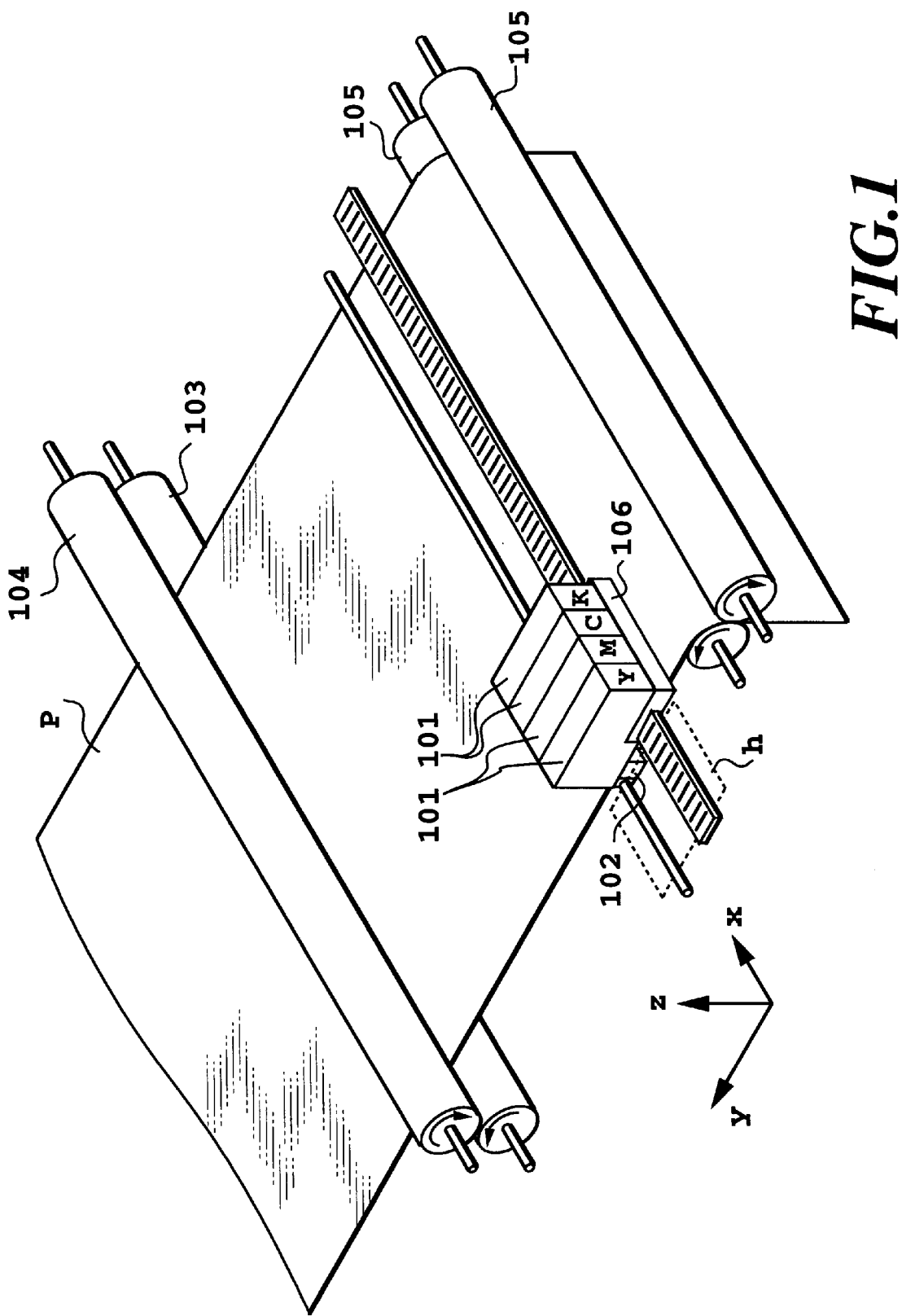
FIG. 1 is a general perspective view of an ink-jet printing apparatus, to which the present invention is applicable.
Figure 2:
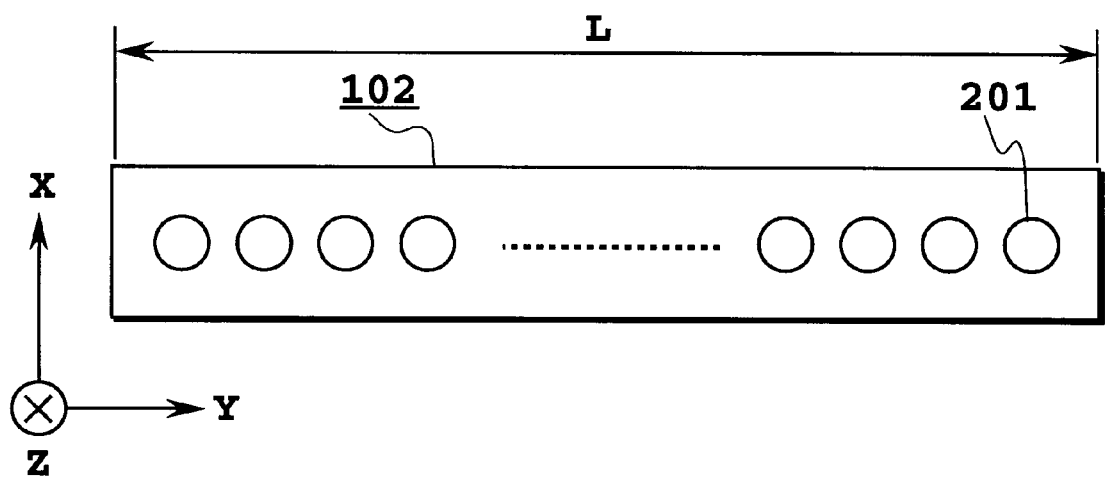
FIG. 2 diagrammatically illustrates a nozzle array in a printing head, to which the present invention is applicable.
Figure 3C:
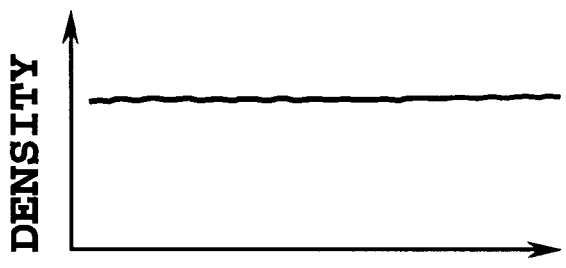
FIGS 3A, 3B and 3C are illustrations for explaining an ideal printing condition in the ink-jet printing apparatus.
Figure 3B:
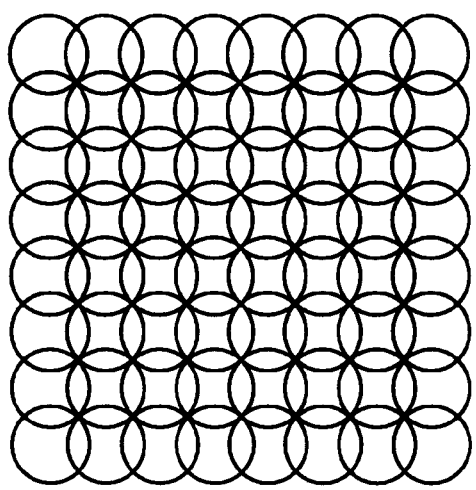
Figure 3A:
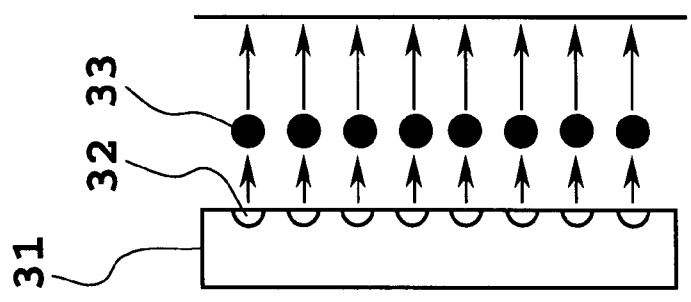
Figure 4C:
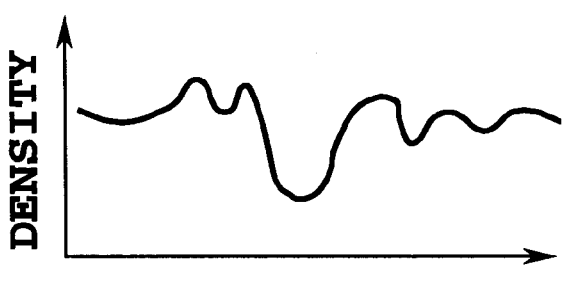
FIGS. 4A, 4B and 4C are illustrations for explaining a printing condition causing density variations in the ink-jet printing apparatus.
Figure 4B:
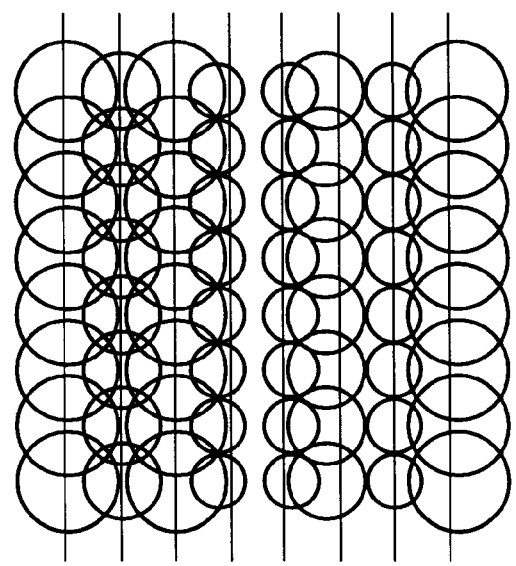
Figure 4A:
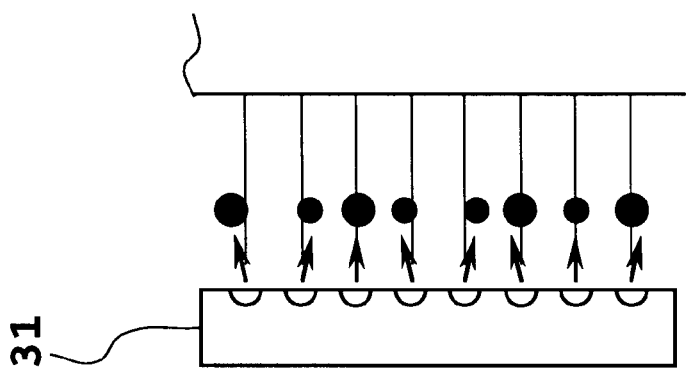
Figure 6A:
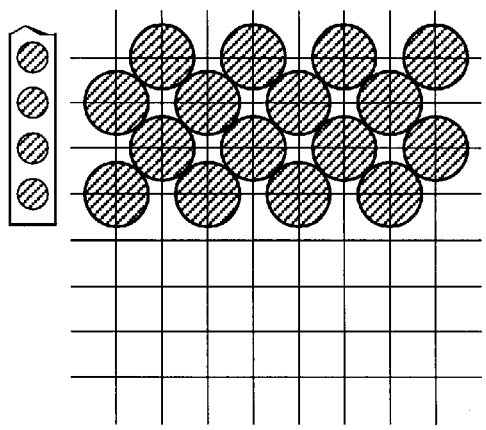
FIGS. 6A, 6B and 6C are illustrations for explaining another example of reduction of density variations by the divided printing method.
Figure 6B:
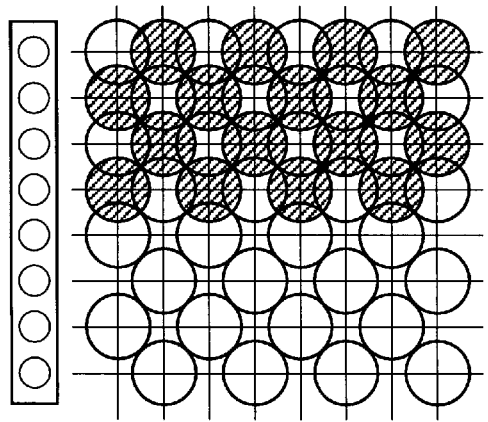
Figure 6C:
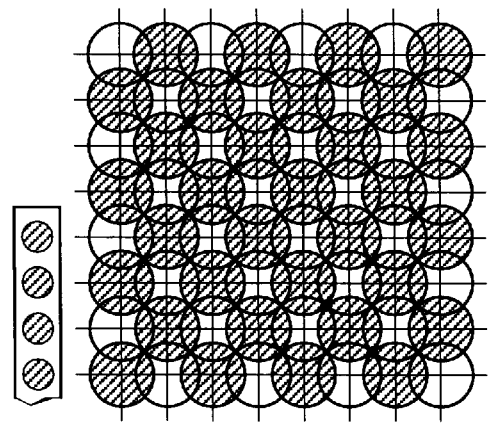
Figure 7A:
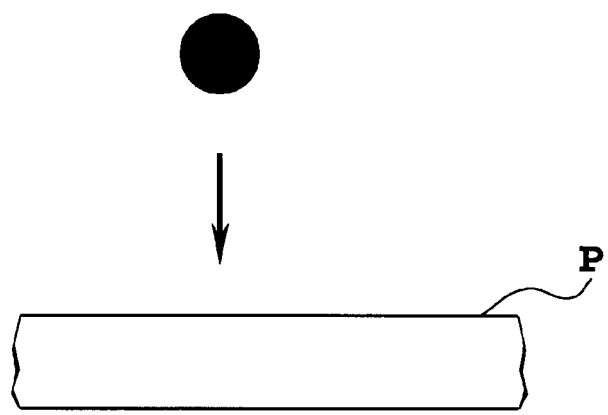
FIGS. 7A to 7D are illustrations for explaining mutual overlap of dots in adjacent scanning regions.
Figure 7B:
Figure 7C:
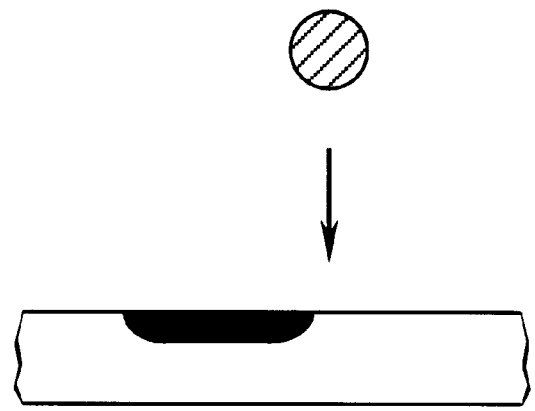
Figure 7D:
Figure 8:
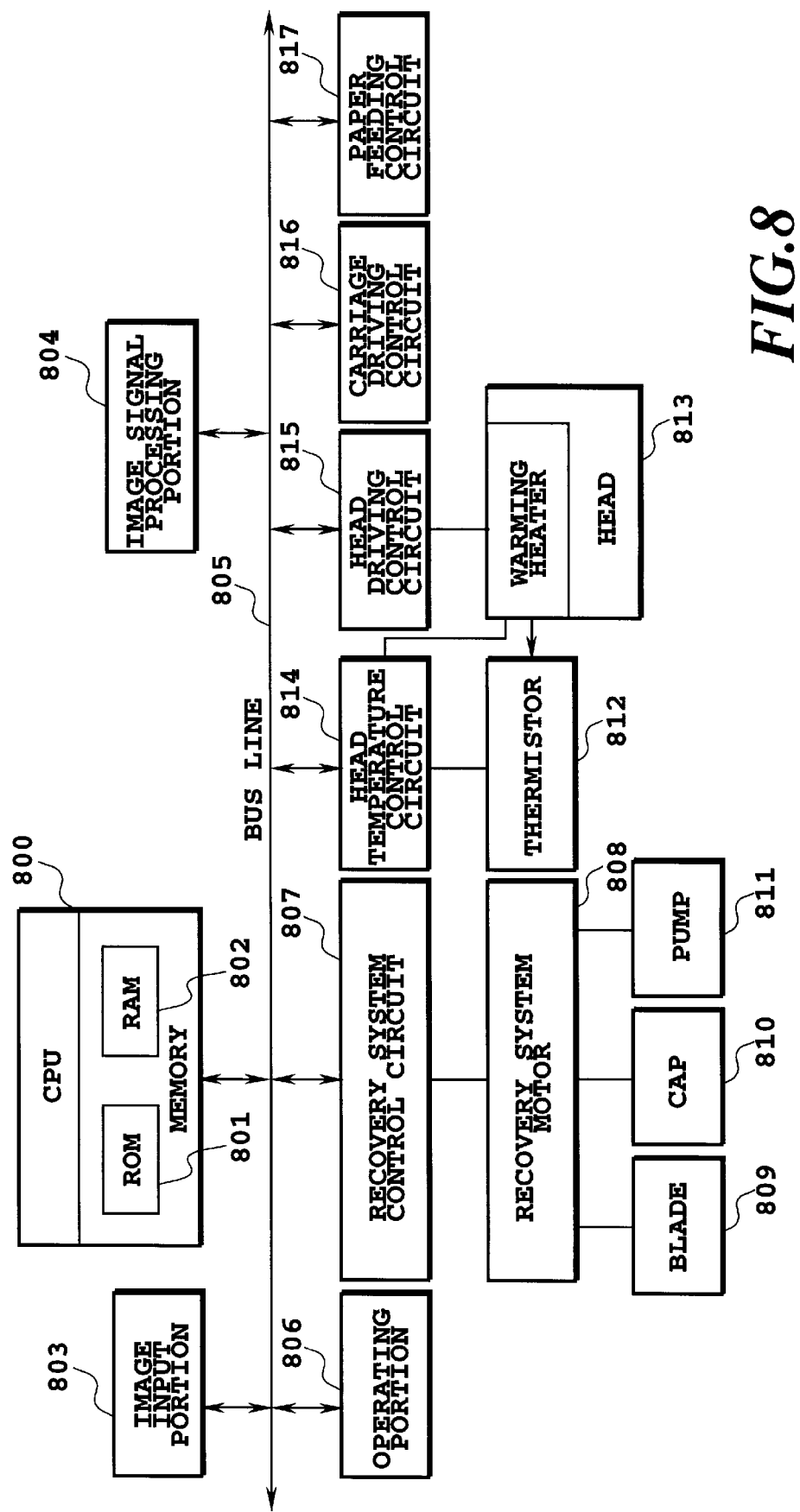
FIG. 8 is a block diagram showing an example of control, system in the ink-jet printing apparatus, to which the present invention is applicable.

FIG. 8 is a block diagram showing an example of a construction of a control system of one embodiment of an ink-jet printing apparatus according to the present invention. It should be noted that as a mechanical construction of the shown embodiment of the ink-jet printing apparatus, a construction illustrated in FIG. 1 can be employed.

In FIG. 8, CPU 800 executes control of respective portion of the apparatus through a main bus line 805 and data processing. Namely, CPU 800 controls data processing, head driving and carriage driving through respective portions which will be explained with reference to FIG. 9 and subsequent drawings, according to a program stored in ROM 801. RAM 802 is used as a work area for data processing or so on by CPU 800. On the other hand, as a memory, a hard disk and the like may be provided in addition.

An image input portion 803 has an interface with a host system, i.e. a computer as an information processing device, an image scanning device and so on and temporarily stores an image input from the host system. An image processing portion 804 executes a color conversion process, a binarization process or the like and, in addition, a data processing shown in FIG. 7 and subsequent drawings.

In a control circuit 807 for a recovery system, a recovery operation, such as preparatory ejection and the like is controlled according to a recovery processing program stored in RAM 802. Namely, a motor 808 in the recovery system drives a printing head 813 and cleaning blade 809, a cap 810 and a suction pump 811 arranged in opposition to the printing head 813.

On the other hand, a head driving control circuit 815 controls driving of electrothermal transducer for ink ejection of the printing head and makes the printing head to perform ejection of an ink for preparatory ejection or for printing. On a substrate, in which the electrothermal transducer for ink ejection of the printing head is provided, a warming heater is provided which can heat a temperature of the ink within the printing head at a predetermined set temperature. On the other hand, a thermistor 812 is similarly provided on the substrate, and is adapted for actually measuring the ink temperature within the printing head. The thermistor 812 may also be provided outside of the substrate and may be provided in the vicinity of the printing head 813.

Furthermore, similarly, a carriage driving control circuit 816 and a paper feeding control circuit 817 control movement of respective carriage and paper feeding according to the program.

Several embodiments of the present invention on the basis of the construction of the control system as set forth above will be explained hereinafter.

First Embodiment

Figure 9:
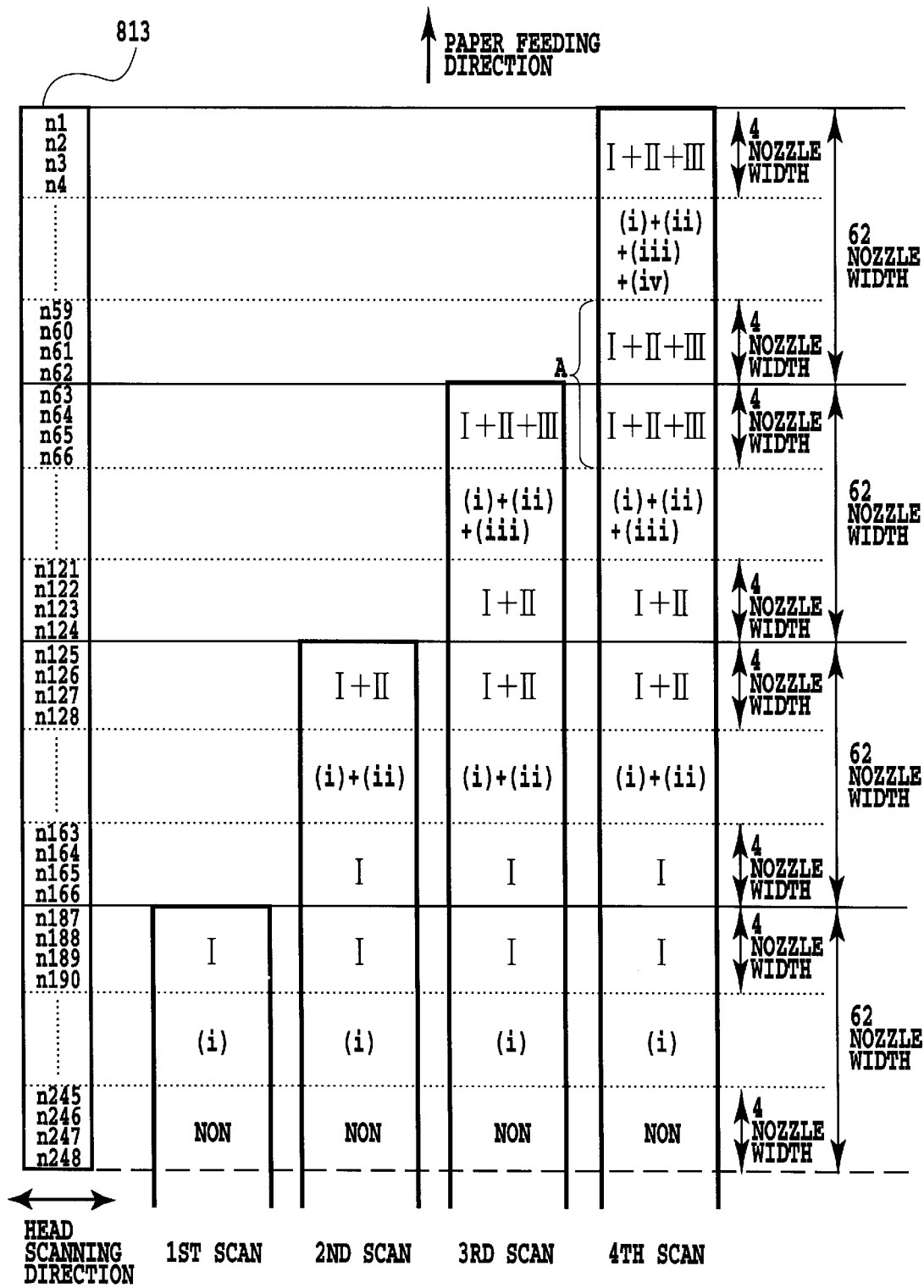
FIG. 9 is an explanatory illustration showing one embodiment of a printing method according to the present invention.

In the first embodiment of the present invention, a printing method will be explained in terms of the case where a monochrome printing is performed for simplification of disclosure, with reference to FIG. 9.

The printing head has two hundreds forty-eight ejection openings (two hundreds forty-eight nozzles) at an interval of 1/600 inch (600 DPI). A printing width per one scan is about 0.41 inches ($\approx$10.50 mm). With setting 62 nozzle width (62×nozzle pitch) derived by dividing the printing width per one scan by four (=248/4) as the paper feeding amount, the image is completed by performing printing scan in the scanning direction of the printing head during an interval between paper feedings in the paper feeding direction.

It should be noted that, the following explanation will be given with a definition that the word "boundary portion"

represents not only a region contacting with boundaries of respective scanning regions and extending in a scanning direction with one pixel width, in which dots are possibly formed overlapping with dots in other region, but also a region having several pixels continuing the region of one pixel width region. This is for providing a wider region where the dots overlap in consideration of bleeding between the printing medium and the ink, and the like. In the first embodiment explained hereinafter, a region to be printed by four nozzles is taken as the boundary portion.

Figure 10:
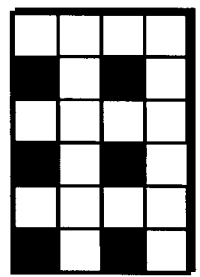
FIG. 10 is a diagrammatic illustration showing thinning patterns in the first, second and third embodiments of the present invention.
Figure 10:
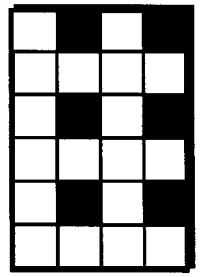
Figure 10:
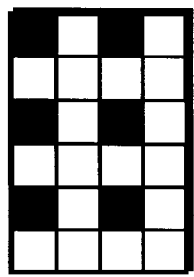
Figure 10:
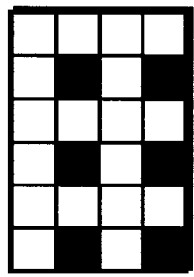
Figure 10:
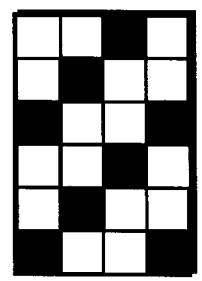
Figure 10:
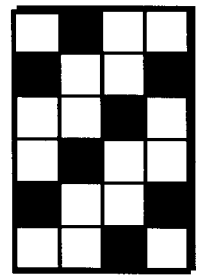
Figure 10:
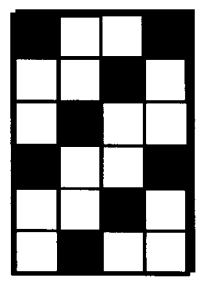
Figure 10:
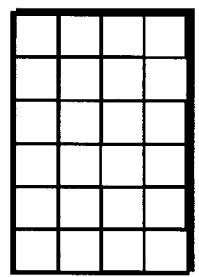

At first, in a scan at the first time shown in FIG. 9 (hereinafter referred to as first scan), printing is performed using sixty-two nozzles of one hundred eighty-seventh (n187) to two hundreds fourth-eighth (n248) among two hundreds forty-eight nozzles. Data for four nozzles from n187 to n190 corresponding to the boundary portion of the scanning region is generated and printed using a thinning pattern I, in which a thinning ratio is $2/3$, as shown in FIG. 10. Data for fifty-four nozzles from nozzle n191 to n244 corresponding to the region excluding the foregoing boundary portion is generated and printed using a thinning pattern (i) in which a thinning ratio shown in FIG. 10 is $3/4$. Also, data for four nozzles from n245 to n248 corresponding to the other boundary portion is generated and printed using a thinning pattern (non)IV in which a thinning ratio shown in FIG. 10 is 100%.

It should be noted that, in FIG. 10, the image formation on a unit area (4×6 dots) is supplemented by patterns I to IV (namely, patterns I to III), or similarly, the image formation on the unit area is supplemented by patterns (i) to (iv).

Subsequently, in the second scan after paper feeding for sixty-two nozzle width, the data for four nozzles from n125 to n128 corresponding to the nozzles in one boundary portion is generated and printed using the thinning pattern II in which the thinning ratio shown in FIG. 10 is $2/3$. Data for fifty-four nozzles from nozzle from n129 to n182 is generated and printed using a thinning pattern (ii) in which a thinning ratio shown in FIG. 10 is $3/40$. Also, data for four nozzles from n183 to n186 corresponding to the other boundary portion is generated and printed using a thinning pattern I in which a thinning ratio shown in FIG. 10 is $2/3$. On the other hand, data for sixty-two nozzles from n187 to n248 is generated and printed using the thinning pattern same as those used in the first scan.

In further subsequent third scan after paper feeding for sixty-two nozzle width, the data for four nozzles from n63 to n67 corresponding to the nozzles in one boundary portion is generated and printed using the thinning pattern III being complementary relationship with the patterns I and II, in which the thinning ratio shown in FIG. 10 is $2/3$. Data for fifty-four nozzles from nozzle from n68 to n120 is generated and printed using a thinning pattern (iii) in which a thinning ratio shown in FIG. 10 is $3/4$. Also, data for four nozzles from n121 to n124 corresponding to the other boundary portion is generated and printed using a thinning pattern II in which a thinning ratio shown in FIG. 10 is $2/3$. On the other hand, data for hundred twenty-four nozzles from n125 to n248 is generated and printed using the thinning pattern same as those used in the second scan.

Finally, in the fourth scan after paper feeding for sixty-two nozzle width, the data for four nozzles from n1 to n4 corresponding to the nozzles in one boundary portion is generated and printed using the thinning pattern (non) IV in which the thinning ratio shown in FIG. 10 is 100%, since the image in this region has already completed. Data for fifty-four nozzles from nozzle n5 to n58 is generated and printed using a thinning pattern (iv) being in complementary relationship with the thinning patterns (i), (ii) and (iii), in which a thinning ratio shown in FIG. 10 is $3/4$. Also, data for four nozzles from n59 to n62 corresponding to the other boundary portion is generated and printed using a thinning pattern III being in complementary relationship with the thinning patterns I and II in which a thinning ratio shown in FIG. 10 is $2/3$. On the other hand, data for hundred eight-six nozzles from n63 to n248 is generated and printed using the thinning pattern same as those used in the third scan.

Subsequent printing is performed using the thinning pattern the same as the fourth scan using two-hundreds forty-eight nozzles from n1 to n248 with paper feeding for sixty-two nozzle width, to complete image.

As set forth above, among the scanning region of sixty-two nozzle width defined by dividing the nozzle array of the printing head into four, the region of the four nozzles on the front side corresponding to the boundary portion is completed image formation by three times of scanning operations along with driving operation of the nozzles from the first scan to the third scan. Also, the region of four nozzles on the rear side corresponding to the boundary portion is completed image formation by three times of scans along with driving operation of the nozzles from the second scan to the fourth scan. On the other hand, for the image region of fifty-four nozzles excluding the boundary portion is completed image formation through four times of scanning operations from the first scan to the fourth scan. Namely, as can be clear from the region A where the boundary portions of two scanning regions in FIG. 9 are in contact, the number of times of scan in the boundary portion is made substantially smaller than that in other region. Also, in the image completed by the same scan, respective of three times of scan of the region A are performed simultaneously. Therefore, formation of dots with time difference can be avoided to successfully prevent the banding due to density variations in the overlapping portion from being formed. It should be noted that since thinning ratio in the boundary portion is smaller than that in other region, the duty per one scan becomes higher than that in other region. Therefore, it is desirable to set the thinning ratio depending upon number of scans for completing the image within a range not causing bleeding of the ink.

On the other hand, while the number of times to effect scanning in the boundary portion is set to three times in the shown embodiment, the number of times of scanning is, of course, not limited to this and can be less than three times as long as no bleeding is caused. Even in this case, it is desirable to simultaneously perform scanning of respective of adjacent boundary portions, in each scan.

It should be noted that while the fixed patterns are used as the thinning patterns in the shown embodiment, it may be possible to employ a random thinning pattern in order to avoid synchronization with the image data. Furthermore, while the size of the boundary portion is set to four nozzles width in the front side and the rear side of each scanning region, the sizes of the boundary portions on the front side and the rear side can be the same or different depending upon composition of the ink or ink absorbing characteristics of the printing medium. On the other hand, it is matter of course that the size per se of the boundary portion can be varied appropriately. Also, for completing the image by four times of scanning, the number of ejection openings of the printing head may be increased to two-hundreds fifty-two and the paper feeding amount may be varied to sixty-three, for varying the number of ejection openings included in a divided printing width. Also, with setting the number of the ejection openings of the printing head to two-hundreds forty and the paper feeding amount to thirty nozzle width, and by setting the number of times of scanning for completing the image to eight times, the boundary portion can complete the image by seven times of scanning operations, substantially.

In the shown embodiment, by performing control set forth above, the ink-jet printing apparatus which obtains good image recording with uniformity having no density fluctuation by avoiding banding caused by density variations at the boundary portion, is provided.

Second Embodiment

In the foregoing first embodiment, among sixty-two nozzle width defined by dividing two-hundreds forty-eight nozzle width as a printing width to be scanned by the printing head in one scan by four, the image regions of the boundary portions are set on the front and rear sides of one scanning regions, such as four nozzle width on the front side and four nozzle width on the rear side. In contrast to this, the shown embodiment will be explained in the case where the boundary portion is set at only one side of the scanning region.

Figure 11:
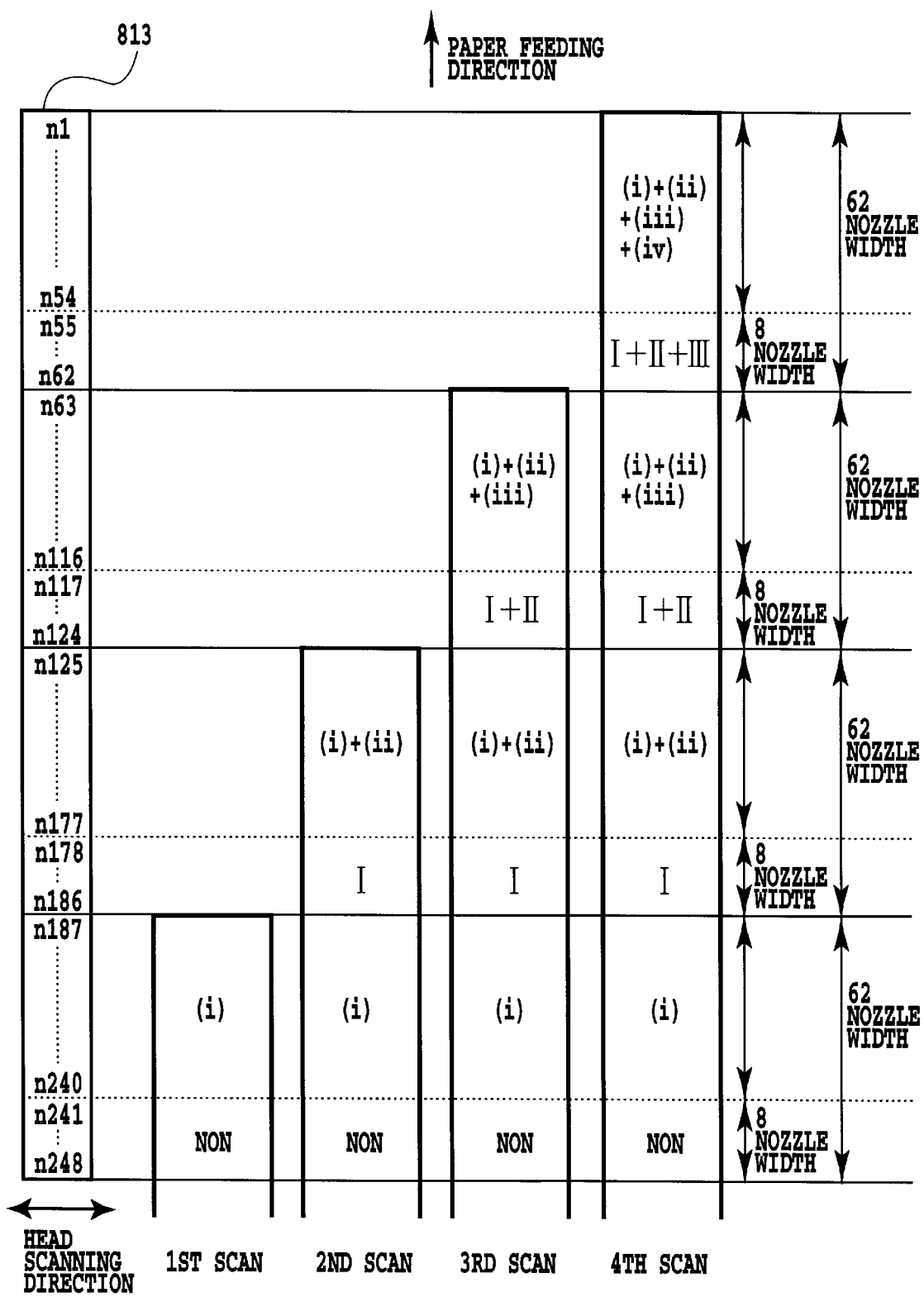
FIG. 11 is an explanatory illustration of the second embodiment of the printing method according to the present invention.

FIG. 11 is an illustration showing the case where the boundary portion is set for eight nozzle width on the rear side of the scanning region, in connection with the shown embodiment of the printing method.

The printing head has two-hundreds forty-eight ejection openings (two-hundreds forty-eight nozzles) at an interval of 1/600 inch. As the paper feeding amount, sixty-two nozzle width (=248/4) derived by dividing the printing width per one scan by four is taken. Then, the printing head performs scan in the head scanning direction to sequentially perform paper feeding in the paper feeding direction in the magnitude set forth above during an interval between scans.

At the first scan, printing is performed using sixty-two nozzles of one hundred eighty-seventh (n187) to two hundreds fourth-eighth (n248) among two hundreds forty-eight nozzles. At this time, the boundary portion is set only on one side of the scanning region corresponding to eight nozzle width from n241 to n248. In this region, data is generated using a thinning pattern (non), in which the thinning ratio shown in FIG. 10 is 100%. Data for fifty-four nozzles from nozzle n187 to n248 is generated and printed using a thinning pattern (i) in which a thinning ratio shown in FIG. 10 is ¾.

Subsequently, in the second scan after paper feeding for sixty-two nozzle width, the data for eight nozzles from n179 to n186 corresponding to the nozzles in the boundary portion is generated and printed using the thinning pattern I in which the thinning ratio shown in FIG. 10 is ⅔. Data for fifty-four nozzles from nozzle from n125 to n178 is generated and printed using a thinning pattern (ii) in which a thinning ratio shown in FIG. 10 is ¾. On the other hand, data for sixty-two nozzles from n187 to n248 is generated and printed using the thinning pattern same as those used in the first scan.

In further subsequent third scan after paper feeding for sixty-two nozzle width, the data for eight nozzles from n117 to n124 corresponding to the nozzles in the boundary portion is generated and printed using the thinning pattern II, in which the thinning ratio of FIG. 10 is ⅔. Data for fifty-four nozzles from nozzle from n63 to n116 is generated and printed using a thinning pattern (iii) in which a thinning ratio shown in FIG. 10 is ¾. On the other hand, data for hundred twenty-four nozzles from n125 to n248 is generated and printed using the thinning pattern same as those used in the second scan.

In the fourth scan after paper feeding for sixty-two nozzle width, the data for eight nozzles from n55 to n62 corresponding to the nozzles in the boundary portion is generated and printed using the thinning pattern III complementary to the patterns I and II, in which thinning pattern III, the tinning ratio shown in FIG. 10 is ⅔. Data for fifty-four nozzles from nozzle n1 to n54 is generated and printed using a thinning pattern (iv) being in complementary relationship with the thinning patterns (i), (ii) and (iii), in which a thinning ratio shown in FIG. 10 is ¾. On the other hand, data for hundred eight-six nozzles from n63 to n248 is generated and printed using the thinning pattern same as those used in the third scan.

Subsequent printing is performed using the thinning pattern the same as the fourth scan using two-hundreds forty-eight nozzles from n1 to n248 with paper feeding for sixty-two nozzle width, to complete image.

Figure 12:
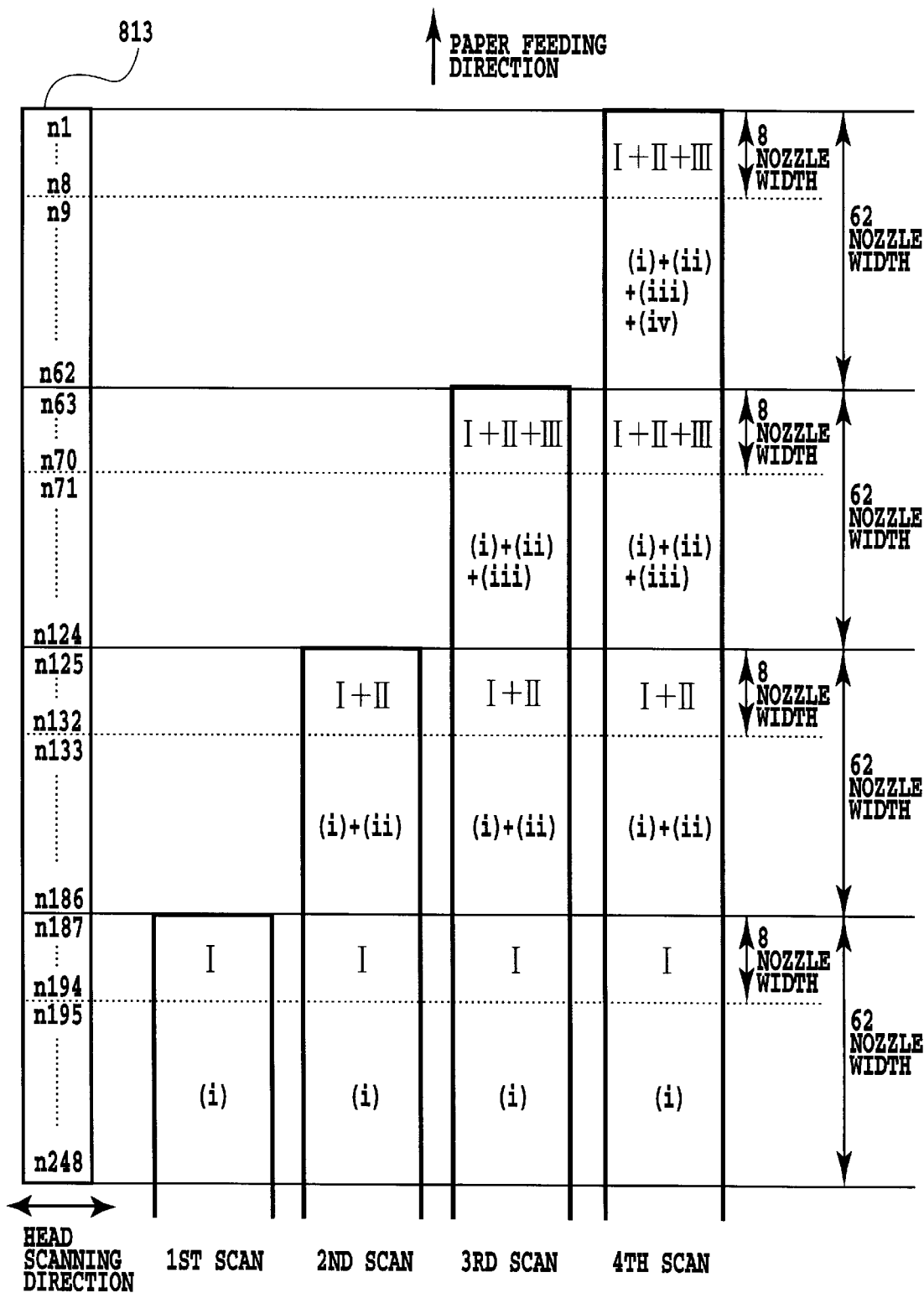
FIG. 12 is an explanatory illustration of another printing method of the second embodiment of the present invention.

FIG. 12 is an illustration showing an example, in which the boundary portion in a width corresponding to eight nozzles is set on the front side of the scanning region, conversely to the example shown in FIG. 11. In this example, the boundary portion is completed image formation by three times of scan in which the nozzles may be driven from the first scan to third scan using thinning pattern I, II and III shown in FIG. 10, while the thinning pattern (non) IV in which the thinning ratio shown in FIG. 10 is 100% is used to the fourth scan. On the other hand, for the image region excluding the boundary portion is completed image formation through four times of scan from the first to the fourth scan using thinning pattern (i) to (iv) shown in FIG. 10.

As set forth above, by setting the boundary portion on one of the front side and the rear side among the scanning region in a width corresponding to sixty-two nozzles defined by dividing the printing width into four, the image in the boundary portion is completed by substantially three scan in the shown embodiment. Therefore, even when the image excluding the boundary portion is completed with four scans, overlapping portion of dots with different time difference will never be caused. Thus, the banding due to density variations is prevented from occurring.

It should be noted that, in the example shown in FIG. 12, strictly speaking, there is a portion where dots are formed with a time difference of one scan in the boundary of respective scanning regions. For example, at the boundary between the scanning region corresponding to the nozzles n125 to n186 and the scanning region corresponding to the nozzles n187 to n248, in the second scan, while the pattern I is printed in the second scan, the pattern (i) is printed in the first scan to cause the time difference of one scan. However, since the pattern (ii) complementary to a part of a portion which is not printed by the pattern (i) is printed simultaneously with the pattern I, the density fluctuation, if any, will be not perceptible.

It should be noted that, while the fixed patterns are used as the thinning patterns in the shown embodiment, it is also possible to use the random thinning pattern in order to prevent synchronization with the image data. On the other hands, the size of the boundary portion is set in a width corresponding to eight nozzles, the size of the boundary portion may be variable depending upon ink composition, the printing medium and so forth.

Third Embodiment

In the third embodiment of the present invention, explanation has been given for the case where printing speed is improved by a paper feeding amount greater than L/N width defined by dividing the printing width L of one scan of the printing head by N.

Namely, assuming that number of scans necessary for completing the image in the image region except for the boundary portion is N, number of scans necessary for completing the image in the image region T of the boundary portion is assumed to be (N−1). In this case, the paper feeding amount is set to be greater in the extent corresponding to T/N derived by dividing the image region T of the boundary portion by N. Particularly, the printing head in the shown embodiment has two-hundreds forty-eight ejection openings (two-hundreds forty-eight nozzles) at an interval of 1/600 inches. For sixty-two (=248/4) nozzle width defined by dividing the printing width L (=248 nozzle width) per one scan by N (=4), when the image region T of the printing scan boundary portion is eight nozzle width, the paper feeding amount is set to 64 nozzle width greater in the extent of two nozzles (=T/N=8/4) to complete the image.

The shown embodiment will be explained for the cases where the image region of the boundary portion of eight nozzle width is set on the front side, where the image region of the boundary portion of eight nozzle width is set on the rear side, and where the boundary portions of four nozzle width are set on both of the front and rear sides.

Figure 13:
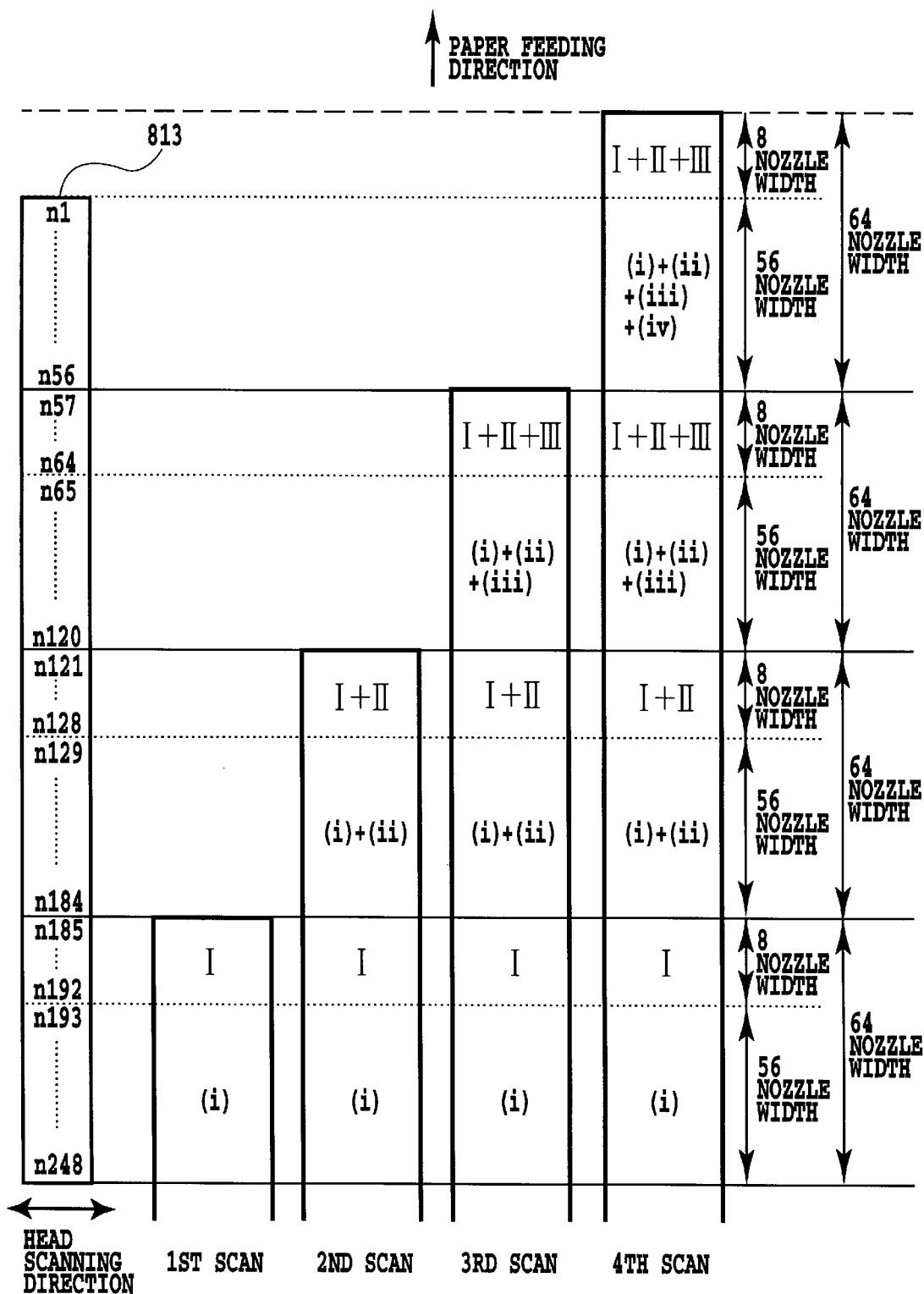
FIG. 13 is an explanatory illustration of the third embodiment of the printing method according to the present invention.

FIG. 13 is an illustration showing a printing method in the case where the boundary portion of eight nozzle width is set only on the front side.

At the first scan, printing is performed using sixty-two nozzles of one hundred eighty-fifth (n185) to two hundreds fourth-eighth (n248) among two hundreds forty-eight nozzles. At this time, the data for eight nozzles from n185 to n192 corresponding to the boundary portion is generated and printed using the thinning pattern I in which the thinning ratio shown in FIG. 10 is 2/3. Data for fifty-six nozzles from nozzle from n193 to n248 corresponding to the region except for the boundary portion is generated and printed using a thinning pattern (i) in which a thinning ratio shown in FIG. 10 is 3/4.

Subsequently, in the second scan after paper feeding for sixty-four nozzle width, the data for eight nozzles from n121 to n128 corresponding to the boundary portion is generated and printed using the thinning pattern II in which the thinning ratio shown in FIG. 10 is 2/3. Data for fifty-six nozzles from nozzle from n129 to n184 is generated and printed using a thinning pattern (ii) in which a thinning ratio shown in FIG. 10 is 3/4. On the other hand, data for sixty-four nozzles from n185 to n248 is generated and printed using the thinning pattern same as those used in the first scan.

In further subsequent third scan after paper feeding for sixty-four nozzle width, the data for eight nozzles from n57 to n64 corresponding to the boundary portion is generated and printed using the thinning pattern III being complementary relationship with the patterns I and II, in which the thinning ratio of FIG. 10 is 2/3. Data for fifty-six nozzles from nozzle from n65 to n120 is generated and printed using a thinning pattern (iii) in which a thinning ratio shown in FIG. 10 is 3/4. On the other hand, data for hundred twenty-eight nozzles from n121 to n248 is generated and printed using the thinning pattern same as those used in the second scan.

In the fourth scan after paper feeding for sixty-four nozzle width, the data for fifty-six nozzles from nozzle n1 to n56 corresponding to the region except for the boundary portion is generated and printed using a thinning pattern (iv) being in complementary relationship with the thinning patterns (i), (ii) and (iii), in which a thinning ratio shown in FIG. 10 is 3/4. On the other hand, data for hundred ninety-two nozzles from n57 to n248 is generated and printed using the thinning pattern same as those used in the third scan.

Subsequent printing is repeatedly performed using the thinning pattern the same as the fourth scan using two-hundreds forty-eight nozzles from n1 to n248 with paper feeding for sixty-four nozzle width, to complete image.

Figure 14:
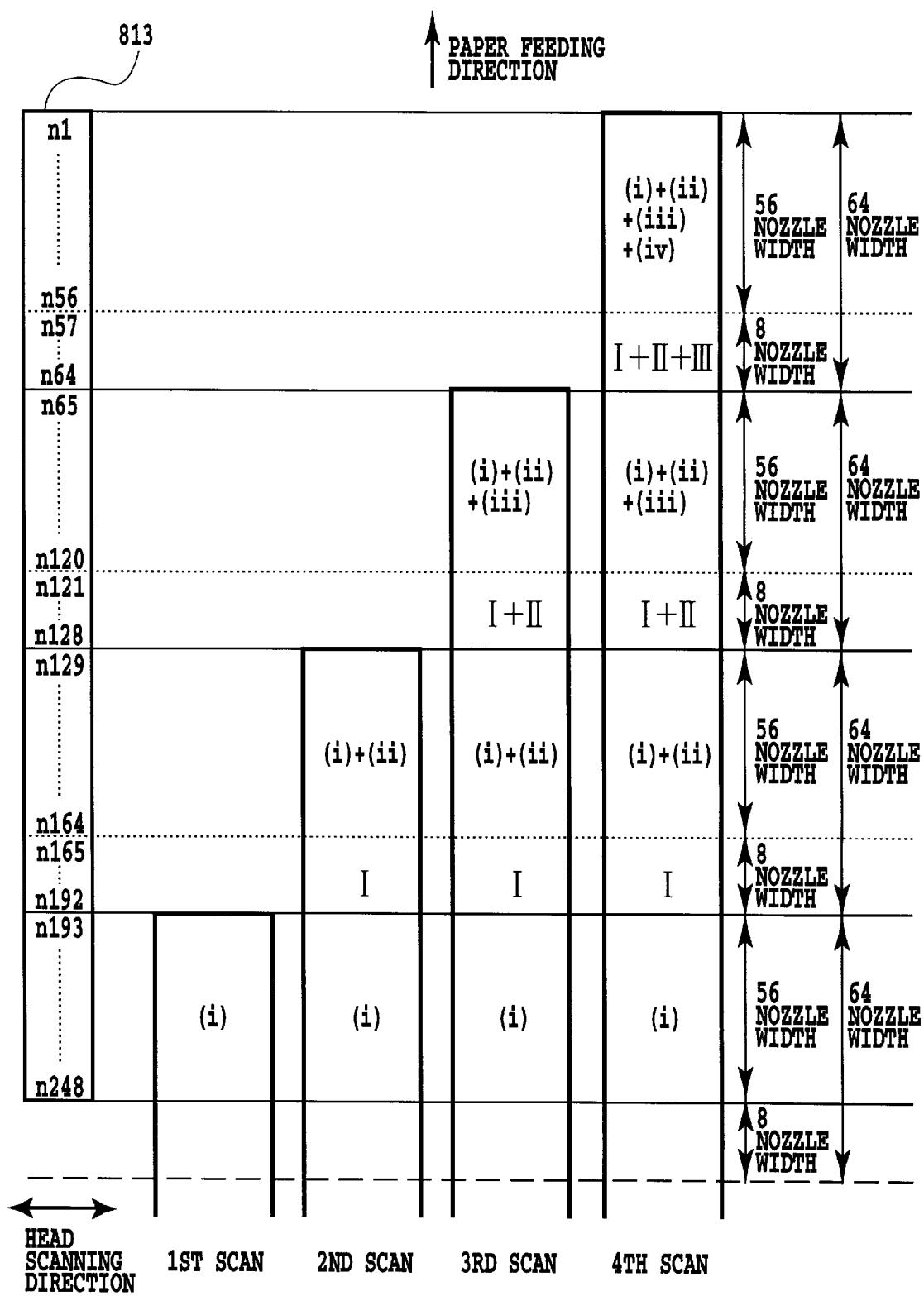
FIG. 14 is an explanatory illustration of another printing method of the third embodiment of the present invention.

FIG. 14 is an illustration showing a printing method for the case where the boundary portion of eight nozzle width is set on the rear side of the scanning region in the shown embodiment.

At first, in the first scan after paper feeding for sixty-four nozzle width, printing is performed using fifty-six nozzle width corresponding to the image region excluding the boundary portion using the nozzles from n193 to n248 with a thinning pattern (i), in which the thinning ratio of FIG. 10 is 3/4. On the other hand, from the second scan to the fourth scan, with sequentially performing paper feeding for sixty-four nozzle width, the image region excluding the boundary portion is completed the image with four scans using the thinning patterns of (ii) to (iv) shown in FIG. 10 and complementary with the thinning pattern (i) of FIG. 10. On the other hand, the image region of the boundary portion is completed the image through three scan using substantially three kinds of thinning patterns of patterns I, II and III of FIG. 10.

Figure 15:
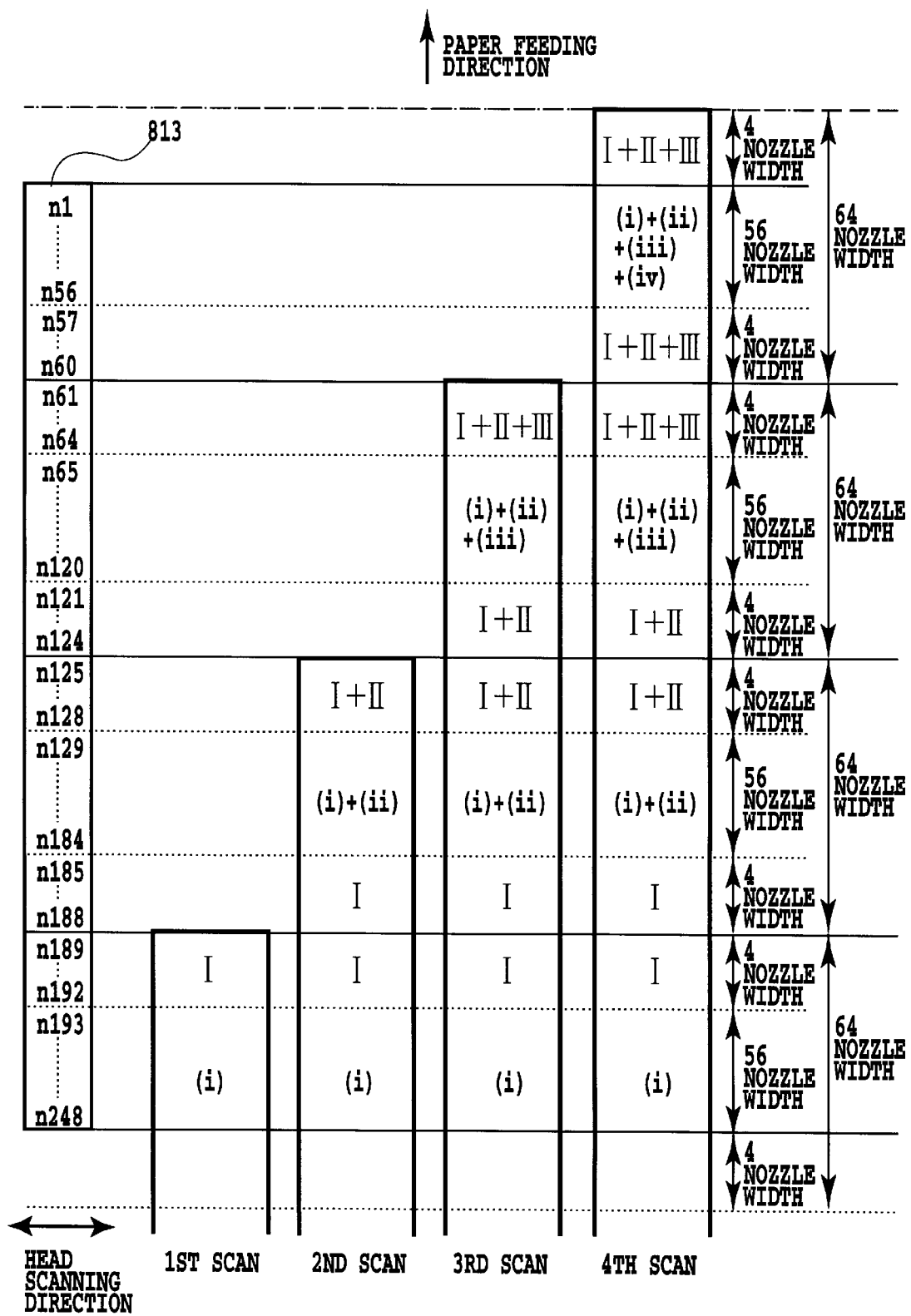
FIG. 15 is an explanatory illustration of a further printing method of the third embodiment of the present invention.

FIG. 15 is an illustration showing a printing method for the case where the boundary portion of eight nozzle width is divided into respective four nozzle width on both of front and rear sides of the scanning region in the shown embodiment.

At first, in the first scan after paper feeding for sixty-four nozzle width, printing of the boundary portion of the four nozzle width using the nozzles from n189 to n192 with the thinning pattern I, in which the thinning ratio of FIG. 10 is 2/3. The image region of fifth-six nozzle width excluding the boundary portion is printing using the nozzles from n193 to 248 with the thinning pattern (i), in which the thinning ratio of FIG. 10 is 3/4. Subsequently, in the second and third scan, with sequentially performing paper feeding of sixty-four nozzle width, the image region of the four nozzle width of the boundary portion is completed through three scan up to the third scan using the thinning patterns of patterns II and III shown in FIG. 10, in complementary relationship with the pattern I. On the other hand, from the second scan to the fourth scan, with sequentially performing paper feeding of sixty-four nozzle width, the image region except for the boundary portion is completed through four scan using the thinning patterns of patterns (ii) to (iv) shown in FIG. 10, in the complementary relationship with the pattern (i). The image region of the rear side boundary portion of four nozzle width is completed through three scan using three kinds of thinning patterns of patterns I, II and III of FIG. 10. On the other hand, in the fourth scan, the image region except for the boundary portion is printed for completing the image using the fifty-six nozzles from n1 to n56, and the rear boundary portion of the four nozzle width is completed the image using four nozzles from n57 to n60.

As set forth above, utilizing the present invention which completes the image with substantially lesser number of scan in the boundary portion, the paper feeding amount can be set to be greater than that derived by equally dividing the nozzle array of the printing head by N to improve printing speed. Also, in the shown embodiment, since the image in the portion where dots overlaps in the boundary of the scanning regions will never be formed with time difference, the banding due to density variations in the boundary of the printing region can be successfully avoided. It should be noted that the embodiment shown in FIG. 13 forms the dots with time difference of one scan in respective scanning regions in strict sense similarly to the embodiment of FIG. 12. However, similarly to FIG. 12, the density variations is not so perceptible.

It should be noted that while the fixed patterns are used as the thinning patterns in the shown embodiment, it may be possible to employ a random thinning pattern in order to avoid synchronization with the image data. Furthermore, while the size of the boundary portion is set in the front side and the rear side of each scanning region, the sizes of the boundary portions on the front side and the rear side can be the same or different depending upon composition of the ink or ink absorbing characteristics of the printing medium.

In the shown embodiment, the ink-jet printing apparatus which can prevent formation of the banding due to density variations at the boundary of the scanning region and thus can obtain high quality printed image with high uniformity free from density fluctuation, with achieving improvement of printing speed.

Fourth Embodiment

The fourth embodiment of the present invention is implementation of the present invention for the case where dots are formed at higher resolution than resolution of the nozzle array of the printing head.

The printing head in the shown embodiment has a hundred twenty-eight ejection openings (a hundred twenty-eight nozzles) arranged with an interval of 1/600 inches. For sixteen nozzle width (=L/N=128/8) derived by dividing the printing width L (=128 nozzle width) per one scan is equally divided by N (=8), paper feeding is repeated with two kinds of paper feeding amount of 16.5 nozzle width and 15.5 nozzle width to complete the image by forming dots with an interval of 1/1200 inches (1200 dpi). On the other hand, the boundary portion of the shown embodiment sets in eight nozzle width at the front side of the scanning region.

FIGS. 16(A) to 16(g) are illustrations showing a thinning pattern to be employed in the shown embodiment. Eight kinds of thinning patterns of patterns (A) to (H) are in mutually complementary relationship. Similarly, six thinning patterns of (a) to (f) are also in mutually complementary relationship. These patterns have a resolution of 1200 dpi in the paper feeding direction. Four kinds of thinning patterns (A), (C), (E) and (G) are mutually in complementary relationship in the region of odd number order of pixel positions in the paper feeding direction. Also, four kinds of thinning patterns (B), (D), (F) and (H) are mutually in complementary relationship in the region of even number order of pixel positions in the paper feeding direction. Three kinds of thinning patterns (a), (c) and (e) are mutually in complementary relationship in the region of odd number order of pixel positions in the paper feeding direction. Three kinds of thinning patterns (b), (d) and (f) are mutually in complementary relationship in the region of even number order of pixel positions in the paper feeding direction.

Figure 16:
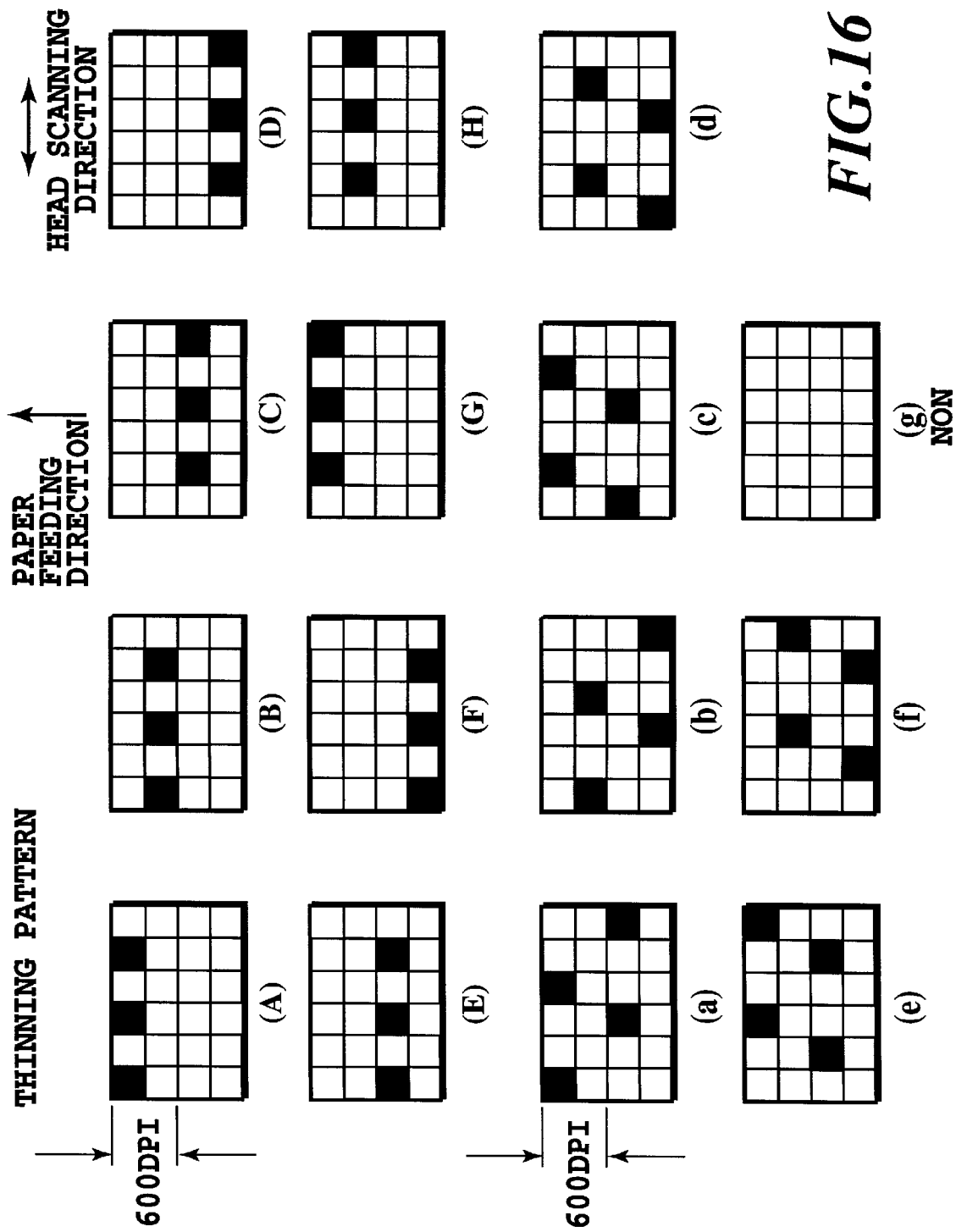
FIG. 16 is diagrammatic illustration showing thinning patterns to be employed in the fourth embodiment of the present invention.

FIGS. 17A and 17B show an illustration for explaining the shown embodiment of printing method. At first, in the first scan, after paper feeding in sixteen and half nozzle width, printing of the odd number order of pixels in the paper feeding direction is performed using sixteen nozzles from n113 to n128 among a hundred twenty-eight nozzles. At this time, the boundary portion is printed with using eight nozzles from n113 to n120, using the thinning pattern (a), in which the thinning ratio of FIG. 16 is 5/6. On the other hand, the image region excluding the boundary portion is printed using eight nozzles from n121 to n128 with the thinning pattern (A), in which the thinning ratio shown in FIG. 16 is 7/8.

Next, in the second scan, after paper feeding in fifteen and half nozzle width, printing of the even number order of pixels in the paper feeding direction is performed. The boundary portion is printed with using eight nozzles from n95 to n104 and eight nozzles from n113 to n120, using the thinning pattern (b), in which the thinning ratio of FIG. 16 is 5/6. On the other hand, the image region excluding the boundary portion is printed using eight nozzles from n105 to n112 and eight nozzles from n121 to n128 with the thinning pattern (B), in which the thinning ratio shown in FIG. 16 is 7/8.

Subsequently, in the third scan, after paper feeding in sixteen and half nozzle width, printing of the odd number order of pixels in the paper feeding direction is performed. Here, the boundary portion is printed using eight nozzles from n81 to n88 with using the thinning pattern (c) shown in FIG. 16, and also using eight nozzles from n95 to n104 and eight nozzles from n113 to n120, using the thinning pattern (a) shown in FIG. 16. On the other hand, the image region excluding the boundary portion is printed using eight nozzles from n89 to n96 with using the thinning pattern (C), and also using eight nozzles from n105 to n112 and eight nozzles from n121 to n128 with the thinning pattern (A) shown in FIG. 16.

Subsequently, in the fourth scan, after paper feeding in fifteen and half nozzle width, printing of the even number order of pixels in the paper feeding direction is performed. The image region in the boundary portion is printed with using eight nozzles from n65 to n72 and eight nozzles from n81 to n88, using the thinning pattern (d) shown in FIG. 16 and also using eight nozzles from n95 to n104 and eight nozzles from n113 to n120, using the thinning pattern (b) shown in FIG. 16. On the other hand, the image region excluding the boundary portion is printed using eight nozzles from n73 to n80 and eight nozzles from n89 to n96 with the thinning pattern (D) of FIG. 16 and also using eight nozzles from n105 to n112 and eight nozzles from n121 to n128 with the thinning pattern (B) of FIG. 16.

Subsequently, in the fifth scan, after paper feeding in sixteen and half nozzle width, printing of the odd number order of pixels in the paper feeding direction is performed. The boundary portion is printed with using eight nozzles from n49 to n56 using the thinning pattern (e) shown in FIG. 16, also using eight nozzles from n65 to n72 and eight nozzles from n81 to n88 with the thinning pattern (c) of FIG. 16, and further using eight nozzles from n95 to n104 and eight nozzles from n113 to n120 with the thinning pattern (a) of FIG. 16. On the other hand, the image region excluding the boundary portion is printed using eight nozzles from n57 to n64 using the thinning pattern (E) shown in FIG. 16, also using eight nozzles from n73 to n80 and eight nozzles from n89 to n96 with the thinning pattern (C) of FIG. 16, and further using eight nozzles from n105 to n112 and eight nozzles from n121 to n128 with the thinning pattern (A) of FIG. 16.

Subsequently, in the sixth scan, after paper feeding in fifteen and half nozzle width, printing of the even number order of pixels in the paper feeding direction is performed. The boundary portion is printed with using eight nozzles from n33 to n40 and eight nozzles from n49 to n56 using the thinning pattern (f) shown in FIG. 16, also using eight nozzles from n65 to n72 and eight nozzles from n81 to n88 with the thinning pattern (d) of FIG. 16, and further using eight nozzles from n95 to n104 and eight nozzles from n113 to n120 with the thinning pattern (b) of FIG. 16. On the other hand, the image region excluding the boundary portion is printed using eight nozzles from n41 to n48 and eight nozzles from n57 to n64 using the thinning pattern (F) shown in FIG. 16, also using eight nozzles from n73 to n80 and eight nozzles from n89 to n96 with the thinning pattern (D) of FIG. 16, and further using eight nozzles from n105 to n112 and eight nozzles from n121 to n128 with the thinning pattern (B) of FIG. 16.

Subsequently, in the seventh scan, after paper feeding in sixteen and half nozzle width, printing of the odd number order of pixels in the paper feeding direction is performed. The boundary portion is printed with using eight nozzles from n17 to n24 with thinning pattern (non) (g) having thinning ratio of 100% shown in FIG. 16, using eight nozzles from n33 to n40 and eight nozzles from n49 to n56 using the thinning pattern (e) shown in FIG. 16, also using eight nozzles from n65 to n72 and eight nozzles from n81 to n88 with the thinning pattern (c) of FIG. 16, and further using eight nozzles from n95 to n104 and eight nozzles from n113 to n120 with the thinning pattern (a) of FIG. 16. On the other hand, the image region excluding the boundary portion is printed using eight nozzles from n25 to n32 with the thinning pattern (G) shown in FIG. 16, using eight nozzles from n41 to n48 and eight nozzles from n57 to n64 using the thinning pattern (E) shown in FIG. 16, also using eight nozzles from n73 to n80 and eight nozzles from n89 to n96 with the thinning pattern (C) of FIG. 16, and further using eight nozzles from n105 to n112 and eight nozzles from n121 to n128 with the thinning pattern (A) of FIG. 16.

Subsequently, in the eighth scan after paper feeding in fifteen and half nozzle width, even number order of pixels in the paper feeding direction are printed using all of the nozzles in the printing head. Ninety-six nozzles from n33 to n128, printing is performed with thinning patterns used in the sixth scan. Among the scanning region corresponding to the nozzles from n1 to n32, the image in the boundary portion has already been completed. Therefore, printing is performed using eight nozzles from n1 to n8 and eight nozzles from n17 to n24 with thinning pattern (non) of FIG. 16, in which the thinning ratio is 100%. On the other hand, the image region except for the boundary portion is printed using eight nozzles from n9 to n16 and eight nozzles from n25 to n32 with thinning pattern (H) of FIG. 16.

Subsequently, in the ninth scan after paper feeding in sixteen and half nozzle width, odd number order of pixels in the paper feeding direction are printed using all of the nozzles in the printing head. A hundred twelve nozzles from n17 to n128, printing is performed with thinning patterns used in the seventh scan. Among the scanning region corresponding to the nozzles from n1 to n16, the image in the boundary portion has already been completed. Therefore, printing is performed using eight nozzles from n1 to n8 with thinning pattern (non) of FIG. 16, in which the thinning ratio is 100%. On the other hand, the image region except for the boundary portion is printed using eight nozzles from n9 to n16 with thinning pattern (G) of FIG. 16.

As set forth above, in the scan of odd number order, the pixels in the odd number order in the paper feeding direction are printed, and in the scan of even number order, the pixels in the even number order in the paper feeding direction are printed. Associating with this, by performing paper feeding with offset of half nozzle width, printing in 1200 dpi in the paper feeding direction is performed. In this case, each boundary portion is completed through substantially three scans while the image region except for the boundary portion is completed through four scan so as to avoid occurrence of a banding due to density variations at the boundary of the scanning regions.

It should be noted that, while the fixed patterns are used as the thinning patterns in the shown embodiment, it is also possible to use the respective random thinning pattern for the pixels in the odd number order and the even number order in the paper feeding direction, in order to prevent synchronization with the image data. On the other hands, the size of the boundary portion is set in a width corresponding to eight nozzles, the size of the boundary portion may be variable depending upon ink composition, the printing medium and so forth.

In the shown embodiment, by performing control as set forth above, the resolution of printing is higher than resolution of the nozzle pitch in the printing head. Even in this case, it be comes possible to provide the ink-jet printing apparatus, in which banding due to density variations at the boundary of the scanning regions is successfully avoided to obtain high quality image with high uniformity free from density fluctuation.

It should be noted that while the present invention has been explained in terms of the (embodiments, in which so-called divided printing method is applied, the present invention is not limited to the disclosed printing method but is applicable for a printing method, in which printing is completed by a plurality of times of scanning by establishing correspondence between the same scanning region and the same nozzle.

Further Descriptions

The present invention achieves distinct effect when applied to a recording head or a recording apparatus which has means for generating thermal energy such as electrothermal transducers or laser light, and which causes changes in ink by the thermal energy so as to eject ink. This is because such a system can achieve a high density and high resolution recording.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laying-open Nos. 59-123670 (1984) and 59-138461 (1984) in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present invention can be also applied to a so-called full-line type recording head whose length equals the maximum length across a recording medium. Such a recording head may consists of a plurality of recording heads combined together, or one integrally arranged recording head.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. Examples of the recovery system are a capping means and a cleaning means for the recording head, and a pressure or suction means for the recording head. Examples of the preliminary auxiliary system are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Patent Application Laying-open Nos. 54-56847 (1979) or 60-71260 (1985). The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

As can be clear from the explanation given hereabove, according to the present invention, in the boundary portion set for each scanning region, the number of times of scans required for completing printing is set substantially smaller than that required in other region so that each scan to be performed for the boundary portion can be performed simultaneously in the regions adjacent with each other, in each scan. Therefore, in the boundary of the adjacent scanning regions, ink dots will never be formed with time difference therebetween. As a result, a banding caused by density variations at the boundary portion is avoided and therefore, a high quality printing can be performed.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An ink-jet printing apparatus employing a printing head capable of ejecting an ink, comprising:

means for scanning said printing head for a plurality of times with respect to the same scanning region of a printing medium;

means for relatively transporting said printing medium between said scans in a direction different from a scanning direction of said printing head;

means for driving said printing head during said scan for performing printing of respective scanning region sequentially; and control means for setting the number of times of scanning in a boundary portion in each scanning region adjacent to the other scanning region to be substantially smaller than that in regions other than said boundary portion, and effecting scan for said boundary portion simultaneously with scan of adjacent to the other scanning region.

2. An ink-jet printing apparatus as claimed in claim 1, wherein said control means controls generation of printing data to be supplied said printing head, thereby, setting the number of times of scanning along with driving operation of said printing head in the boundary portion to be smaller than that in the region other than said boundary region in said scanning region, and effecting scanning in said boundary portion simultaneously with scanning in the other scanning region.

3. An ink-jet printing apparatus as claimed in claim 2, wherein said printing head has a plurality of ink ejection openings arrayed in a direction different from said scanning direction, and said control means has means for controlling relative transporting of said printing head to make said ink ejection openings differently used for a respective one of a plurality of scans for the same scanning region.

4. An ink jet printing apparatus as claimed in claim 2, wherein the same ink ejecting opening is used for a plurality of scans for the same scanning region.

5. An ink-jet printing apparatus as claimed in claim 2, wherein said control means performs complementary printing in a plurality of times of scan by thinning with a predetermined thinning ratio, and the thinning ratio in said boundary portion is smaller than the thinning ratio in the region other than said boundary portion.

6. An ink-jet printing apparatus as claimed in claim 1, wherein said printing head has an electrothermal transducer generating a thermal energy for causing film boiling in the ink as an energy to be used for ejection of said ink.

7. An ink-jet printing apparatus employing a printing head capable of ejecting an ink through a plurality of ink ejection openings associating with a printing scan, comprising:

means for making said printing head to scan for N times with dividing a region to be printed by said printing head having plurality of said ejection openings by N which N is an integer greater than or equal to two;

means for sequentially and relatively transporting a printing medium in a direction different from the direction of said scan, between said scans;

a first control means for performing image formation for each of said divided scanning regions by driving said printing head using N kinds of thinning patterns in mutually complementary relationship; and a second control means for making the number of timings of scanning for completing image formation of a boundary portion adjacent other scanning region to be substantially smaller than N times, and performing scanning simultaneously with scanning for said adjacent scanning region.

8. An ink-jet printing apparatus as claimed in claim 7, wherein said second control means employs thinning patterns substantially smaller kinds than N kinds, as the thinning patterns in mutually complementary relationship.

9. An ink-jet printing apparatus as claimed in claim 8, wherein said second control means employs at least one kind of 100% thinning pattern as N kinds of thinning patterns in mutually complementary relationship.

10. An ink-jet printing apparatus as claimed in claim 7, wherein each scanning region divided into N has a width of (L/N)+K wherein K is greater than or equal to 0, and said transporting amount is (L/N)+K.

11. An ink-jet printing apparatus as claimed in claim 10, wherein said width K is the width T/N derived by dividing a width T of said boundary portion by N.

12. An ink-jet printing apparatus as claimed in claim 7, wherein said boundary portion is a region set on a front side and/or a rear side in said transporting direction of each scanning region divided into N.

13. An ink-jet printing apparatus as claimed in claim 7, wherein said second control means employs thinning patterns of (N−M) kinds as thinning patterns in complementary relationship for completing image formation of said boundary portion upon performing image formation at a resolution of M times of a resolution of said plurality of ink ejection openings arrayed in the transporting direction, wherein M is an integer greater than or equal to one.

14. An ink-jet printing apparatus as claimed in claim 13, wherein said thinning patterns are random thinning patterns in mutually complementary relationship in a region located at position per M pixels in said transporting direction.

15. An ink-jet printing apparatus as claimed in claim 13, wherein said transporting is sequentially repeated in a width of (L/N)+P and a width of (L/N)−P assuming the width of said printing region being L in the printing region of M=double of resolution.

16. An ink-jet printing apparatus as claimed in claim 7, wherein said printing head has an electrothermal transducer generating a thermal energy for causing film boiling in the ink as an energy to be used for ejection of said ink.

17. An ink-jet printing method employing a printing head capable of ejecting an ink, comprising the steps of:

a step for scanning said printing head for a plurality of times with respect to the same scanning region of a printing medium;

a step for relatively transporting said printing medium between said scans in a direction different from a scanning direction of said printing head;

a step for driving said printing head during said scan for performing printing of respective scanning region sequentially; and a control step for setting the number of times of scanning in a boundary portion in each scanning region adjacent to the other scanning region to be substantially smaller than that in regions other than said boundary portion, and effecting scan for said boundary portion simultaneously with scan of adjacent to the other scanning region.

18. An ink jet printing method as claimed in claim 17, wherein said printing head has a plurality of ink ejection openings arrayed in a direction different from said scanning direction, and at said control step, said relatively transporting of said printing head is controlled to make said ink ejection openings differently used for the respective one of a plurality of scans for the same scaning region.

19. An ink jet printing method as claimed in claim 17, wherein the same ink ejecting opening is used for a plurality of scans for the same scanning region.

20. An ink-jet printing method as claimed in claim 17, wherein at said control step, complementary printing in a plurality of times of scan by thinning with a predetermined thinning ratio is performed, and the thinning ratio in said boundary portion is smaller than the thinning ratio in the region other than said boundary portion.

* * * * *

UNITED STATES PATENT AND TRADEMARK OFFICE
CERTIFICATE OF CORRECTION

PATENT NO. : 6,142,604
DATED : November 7, 2000
INVENTOR(S) : Hidehiko Kanda et al.

It is certified that error appears in the above-identified patent and that said Letters Patent is hereby corrected as shown below:

Title page,
Item [56] References Cited, under FOREIGN PATENT DOCUMENTS
Insert: -- 59-123670     7/1984     Japan --.

Column 9,
Line 38, "3/40." should read -- 3/4. --.

Column 11,
Line 49, "from" (second occurrence) should be deleted.

Column 12,
Line 54, "hands" should read -- hand --.

Column 14,
Line 59, "overlaps" should read -- overlap --.

Column 18,
Line 1, "hands" should read -- hand --; and
Line 9, "be comes" should read -- becomes --.

Column 22,
Lines 36 and 43, "ink jet" should read -- ink-jet --;
Line 42, "scaning" should read -- scanning --.

Signed and Sealed this

Sixth Day of November, 2001

Attest:

NICHOLAS P. GODICI
*Attesting Officer*     *Acting Director of the United States Patent and Trademark Office*